(12) United States Patent
Neumann

(10) Patent No.: US 12,437,256 B2
(45) Date of Patent: Oct. 7, 2025

(54) METHODS AND SYSTEMS FOR TRANSPORT OF AN ALIMENTARY COMPONENT BASED ON DIETARY REQUIRED ELIMINATIONS

(71) Applicant: KPN INNOVATIONS, LLC., Lakewood, CO (US)

(72) Inventor: Kenneth Neumann, Lakewood, CO (US)

(73) Assignee: KPN INNOVATIONS LLC, Lakewood, CO (US)

( * ) Notice: Subject to any disclaimer, the term of this patent is extended or adjusted under 35 U.S.C. 154(b) by 93 days.

(21) Appl. No.: 17/492,993

(22) Filed: Oct. 4, 2021

(65) Prior Publication Data

US 2022/0036297 A1    Feb. 3, 2022

Related U.S. Application Data

(63) Continuation of application No. 16/430,394, filed on Jun. 3, 2019, now Pat. No. 11,182,729.

(51) Int. Cl.
*G06F 16/9535*    (2019.01)
*G06N 5/04*    (2023.01)
*G06N 20/00*    (2019.01)
*G06Q 10/0832*    (2023.01)
*H04L 67/306*    (2022.01)
*G06F 16/23*    (2019.01)

(52) U.S. Cl.
CPC ........... *G06Q 10/0832* (2013.01); *G06N 5/04* (2013.01); *G06N 20/00* (2019.01); *H04L 67/306* (2013.01); *G06F 16/2365* (2019.01)

(58) Field of Classification Search
None
See application file for complete search history.

(56) References Cited

U.S. PATENT DOCUMENTS

| 8,060,383 | B2 * | 11/2011 | Badinelli | G06Q 40/08 705/2 |
| 8,249,946 | B2 * | 8/2012 | Froseth | G06Q 10/101 426/103 |
| 9,159,088 | B2 * | 10/2015 | Dillahunt | G06Q 30/0261 |
| 10,225,365 | B1 * | 3/2019 | Hotchkies | H04L 67/63 |
| 10,856,807 | B2 * | 12/2020 | Fitzpatrick | A61B 5/4866 |
| 10,929,916 | B2 * | 2/2021 | Abutair | G06F 16/9535 |
| 11,397,911 | B2 * | 7/2022 | Silverman | G06Q 10/06315 |
| 2002/0004749 | A1 * | 1/2002 | Froseth | G06Q 50/00 705/16 |

(Continued)

*Primary Examiner* — Polina G Peach
(74) *Attorney, Agent, or Firm* — Caldwell Intellectual Property Law

(57) ABSTRACT

A system for arranging transport of an alimentary component includes a computing device configured to identify at least a significant category as a function of a dietary request, produce an alimentary instruction set as a function of the at least a significant category, wherein producing the alimentary instruction set further comprises identifying a compatible food group, and producing the alimentary instruction set as a function of the at least a significant category and the compatible food group, generate a transport request as a function of the alimentary instruction set and the dietary request, and enact the transport request as a function of a fulfillment network

20 Claims, 14 Drawing Sheets

(56) References Cited

U.S. PATENT DOCUMENTS

| | | | |
|---|---|---|---|
| 2004/0107141 A1* | 6/2004 | Conkel | G06Q 10/087 705/15 |
| 2008/0133724 A1* | 6/2008 | Clark | H04L 67/12 709/223 |
| 2008/0178749 A1* | 7/2008 | Stutman | G06Q 30/0283 340/286.01 |
| 2010/0003647 A1* | 1/2010 | Brown | G09B 19/0092 434/127 |
| 2013/0185646 A1* | 7/2013 | Wiggins | H04L 67/62 715/739 |
| 2013/0224694 A1* | 8/2013 | Moore | G09B 19/0092 434/127 |
| 2014/0188543 A1* | 7/2014 | Pearlmutter | G06Q 10/06315 705/7.25 |
| 2014/0236759 A1* | 8/2014 | Mirabile | G06Q 30/0633 705/26.8 |
| 2015/0363860 A1* | 12/2015 | Lantrip | G06Q 30/0631 705/26.7 |
| 2016/0364679 A1* | 12/2016 | Cao | G06Q 50/30 |
| 2017/0091880 A1* | 3/2017 | Krishnan | G06Q 50/12 |
| 2018/0001184 A1* | 1/2018 | Tran | G16H 50/20 |
| 2018/0144820 A1* | 5/2018 | Grimmer | A61P 25/18 |
| 2018/0165747 A1* | 6/2018 | Patten | G06Q 30/0603 |
| 2018/0240181 A1* | 8/2018 | Lopez | G06Q 10/00 |
| 2018/0240359 A1* | 8/2018 | Hujsak | G06N 20/00 |
| 2018/0293638 A1* | 10/2018 | Simpson | G01N 33/492 |
| 2019/0062813 A1* | 2/2019 | Amin | B01L 3/5635 |
| 2019/0102523 A1* | 4/2019 | Buckley | G06V 20/20 |
| 2019/0213914 A1* | 7/2019 | Vallance | G09B 19/0092 |
| 2019/0295440 A1* | 9/2019 | Hadad | G06F 40/137 |
| 2019/0370915 A1* | 12/2019 | Garden | G06N 20/00 |

\* cited by examiner

METHODS AND SYSTEMS FOR TRANSPORT OF AN ALIMENTARY COMPONENT BASED ON DIETARY REQUIRED ELIMINATIONS

CROSS-REFERENCE TO RELATED APPLICATIONS

This application is a continuation of Non-provisional application Ser. No. 16/430,394 filed on Jun. 3, 2019 and entitled "METHODS AND SYSTEMS FOR TRANSPORT OF AN ALIMENTARY COMPONENT BASED ON DIETARY REQUIRED ELIMINATIONS," the entirety of which is incorporated herein by reference.

FIELD OF THE INVENTION

The present invention generally relates to the field of artificial intelligence. In particular, the present invention is directed to methods and systems for transport of an alimentary component based on dietary required eliminations.

BACKGROUND

Effective and accurate analysis of data to produce practical and useful instruction sets is challenging. Generating accurate instruction sets is complex in part due to the vast amount of data to be analyzed. Current solutions fail to account for the intricate complexities involved in both producing and receiving meaningful instruction sets.

SUMMARY OF THE DISCLOSURE

In an aspect, a system for arranging transport of an alimentary component includes a computing device configured to identify at least a significant category as a function of a dietary request, produce an alimentary instruction set as a function of the at least a significant category, wherein producing the alimentary instruction set further comprises identifying a compatible food group, and producing the alimentary instruction set as a function of the at least a significant category and the compatible food group, generate a transport request as a function of the alimentary instruction set and the dietary request, and enact the transport request as a function of a fulfillment network.

In another aspect, a method for arranging transport of an alimentary component includes identifying, by a computing device, at least a significant category as a function of a dietary request, producing, by the computing device, an alimentary instruction set as a function of the at least a significant category, wherein producing the alimentary instruction set further comprises identifying a compatible food group, and producing the alimentary instruction set as a function of the at least a significant category and the compatible food group, generating, by the computing device, a transport request as a function of the alimentary instruction set and the dietary request, and enacting, by the computing device, the transport request as a function of a fulfillment network.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for transport of alimentary components based on dietary required eliminations. Training data is received that includes a dietary request and a correlated alimentary process label derived from a source such as a vibrant constitutional network. The dietary request or supplemental data associated with the dietary request may be derived from a user via inputs on a user client device. The user may be a network user of a vibrant constitutional network configured to include the at least a server. The at least a server utilizes the received training data and dietary request, determines the location of the user, and utilizes the location of the user in order to select one or more physical performance entities. A transport request generator module operating on the at least a server utilizes the dietary request and the training data in order to generate a transport request configured to be transmitted and executed by the one or more physical performance entities.

As described herein, dietary required eliminations may include, but are not limited to any food sensitivities and intolerances, user lifestyle preferences (e.g., gluten-free, pescatarian, etc.), body gene variances that affect food processing, or any other user-specific preferences relating to alimentary components configured to be consumed by the user.

Systems and methods described herein provide improvements to the arrangement and dispatch of alimentary components by physical performance entities based on dietary required eliminations of a user. By using a rule-based model or a machine-learned model, one or more analyses are performed on the collected data, and outputs of training data are generated based on the one or more analyses on the collected data. The outputs are used to generate a transport request that is configured to be executed by the physical performance entities based on information and diagnoses derived from the user.

Figure 1:
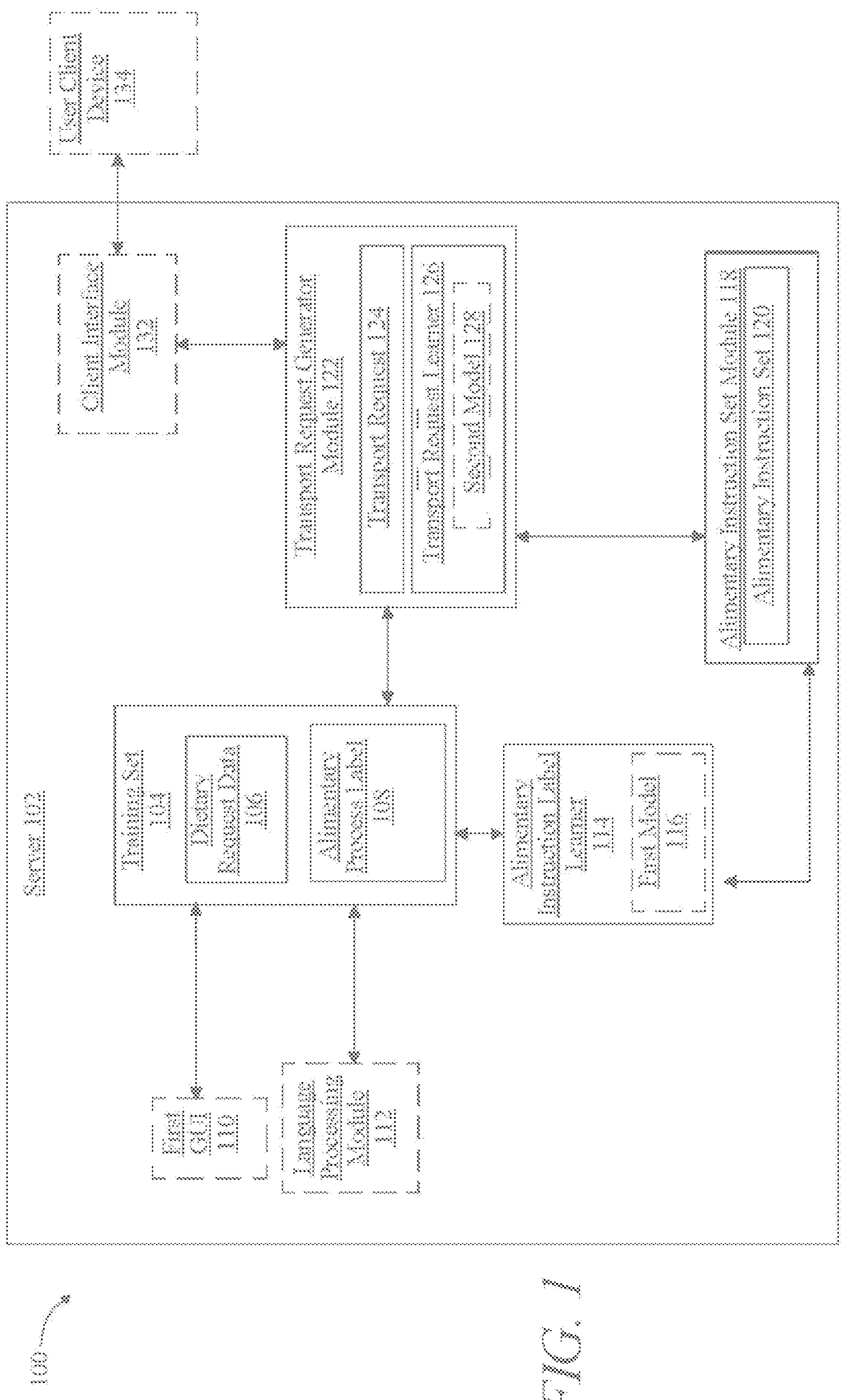
FIG. 1 is a block diagram illustrating an exemplary embodiment of a system for transport of an alimentary component based on dietary required eliminations.

Turning now to FIG. 1, a system 100 for generation of transport requests is illustrated. System 100 includes at least a server 102. At least a server 102 may include any computing device as described herein, including without limitation a microcontroller, microprocessor, digital signal processor (DSP) and/or system on a chip (SoC) as described herein. At least a server 102 may be housed with, may be incorporated in, or may incorporate one or more sensors of at least a sensor. Computing device may include, be included in, and/or communicate with a mobile device such as a mobile telephone or smartphone. At least a server 102 may include a single computing device operating independently, or may include two or more computing device operating in concert, in parallel, sequentially or the like; two or more computing devices may be included together in a single computing device or in two or more computing devices. At least a server 102 with one or more additional devices as described below in further detail via a network interface device. Network interface device may be utilized for connecting a at least a server 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. At least a server 102 may include but is not limited to, for example, a at least a server 102 or cluster of computing devices in a first location and a second computing device or cluster of computing devices in a second location. At least a server 102 may include one or more computing devices dedicated to data storage, security, distribution of traffic for load balancing, and the like. At least a server 102 may distribute one or more computing tasks as described below across a plurality of computing devices of computing device, which may operate in parallel, in series, redundantly, or in any other manner used for distribution of tasks or memory between computing devices. At least a server 102 may be implemented using a "shared nothing" architecture in which data is cached at the worker, in an embodiment, this may enable scalability of system 100 and/or computing device.

With continued reference to FIG. 1, at least a server 102 and/or one or more modules operating thereon may be designed and/or configured to perform any method, method step, or sequence of method steps in any embodiment described in this disclosure, in any order and with any degree of repetition. For instance, at least a server 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. At least a server 102 and/or one or more modules operating thereon may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, server 102 is configured to receive a training set 104 including a plurality of data entries, each data entry of the plurality of data entries including at least an element of first dietary request data 106 and at least a correlated alimentary process label 108 and receive at least a dietary request from a user device. At least a dietary request as used in this disclosure includes a request for a particular diet, food, ingredient, food group, nutrition plan, supplement, style of eating, lifestyle, and/or nutrition. At least a dietary request may include a request for a particular type of diet such as Atkins, Paleo, Whole 30, gluten free, ketogenic, dairy free, Mediterranean, soy free, and the like. At least a dietary request may include elimination of certain foods or food groups because of a dislike for such foods, an allergy to a food, and/or a sensitivity. For example, at least a dietary request may include a request for an egg free diet based on a user's aversion to eggs. In yet another non-limiting example, at least a dietary request may include a request for a diet free of bell peppers because of a user's previous IgG food sensitivity testing. At least a dietary request may include a request for a diet free of shellfish because of a user's IgE allergic response to shellfish that was diagnosed when a user was a little child. At least a dietary request may include a request for a diet based on religious or moral beliefs such as kosher diet or vegetarian diet. At least a dietary request may include a request to eliminate certain food groups such as a nightshade free diet or a grain free diet. At least a dietary request may include a request to eliminate certain ingredients that may be commonly found in food such as a request for a diet free of monosodium glutamate (MSG) or corn starch. At least a dietary request may include a request for a certain level or quality of ingredients such as locally sourced ingredients, free range meats, wild caught fish, organic produce and the like. At least a dietary request may include a request for a certain diet because of a previously diagnosed medical condition, such as a user who has been previously diagnosed with Candida and is following a low sugar diet. At least a dietary request may include a dietary request based on a certain style of eating that a user prefers, such as low carb, high protein, low fat, and the like. At least a dietary request may include a dietary request as a function of a medication, supplementation, and/or medical treatment or therapy that a user may be undergoing. For example, a user currently taking a medication such as metronidazole may generate at least a dietary request for an alcoholic free diet, while a user currently supplementing with zinc may generate at least a dietary request free of oysters.

Continuing to refer to FIG. 1, server 102 may be designed and configured to receive training data. Training data, as used herein, is data containing correlation that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), enabling processes or devices to detect categories of data.

Alternatively or additionally, and still referring to FIG. 1, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name and/or a description of a medical condition or therapy may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below.

Still referring to FIG. 1, server 102 may be configured to receive a training set 104 including a plurality of data entries, each data entry of the training set 104 including at least a first dietary request data 106 and at least a correlated alimentary process label. An "alimentary process label," as used in this disclosure, is an element of data identifying a solution and/or suggestion as to nourishment requirements and/or options contained within a dietary request. Alimentary process label may include nourishment requirements and/or options including potential foods, meals, ingredients, and/or supplements that may be compatible for a user to consume as a function of user's dietary request. For example, a dietary request for a gluten free diet may contain an alimentary process label that contains nourishment options such as gluten free toast, gluten free grains such as buckwheat, rice, and amaranth. In yet another non-limiting example, a dietary request for a raw foods diet may contain an alimentary process label that contains nourishment options including fruits such as strawberries, kiwis, and bananas. At least a first dietary request data 106 may include any data describing the user, user needs, user dietary preferences, and/or user preferences. First dietary request data 106 may include a constitutional restriction such as an injury, a previous diagnosis from a medical professional such as a functional medicine doctor, an allergy or food sensitivity issue, a contraindication to a medication or supplement and the like. For example, a user diagnosed with colitis and currently taking an antibiotic medication such as metronidazole may report a constitutional restriction that includes restrictions on alcohol consumption. At a least a first dietary request data 106 may include religious preferences such as forbidden foods, medical interventions, exercise routines and the like. At least a first dietary request data 106 may include a user's dislike such as for example a user aversion to certain foods or nutrient groups, such as for example an aversion to liver or onions. At least a first dietary request data 106 may include for example a user's likes such as a user's preference to consume animal protein or plant protein. At least a first dietary request data 106 may include for example, a preferred dietary style of eating such as vegetarian, vegan, pescatarian, flexitarian, and the like. At least a first dietary request data 106 may include a preferred style of eating such as for example, paleo, ketogenic, gluten free, grain free, low FODMAP, raw food diet, fruitarian, lacto vegetarianism, ovo vegetarianism, intermittent fasting, Mediterranean diet, carb-conscious, gluten free, nightshade free, dairy free, and the like.

With continued reference to FIG. 1, in each first data element of training set 104, at least an alimentary process label is correlated with at least a first dietary request data 106. In an embodiment, an element of first dietary request data 106 is correlated with at least an alimentary process label where the element of dietary data is located in the same data element and/or portion of data element as the alimentary label; for example, and without limitation, an element of dietary data is correlated with an alimentary label where both element of dietary data and alimentary element are contained within the same first data element of the training set 104. As a further example, an element of dietary data is correlated with an alimentary element where both share a category label as described in further detail below, where each is within a certain distance of the other within an ordered collection of data in data element, or the like. Still further, an element of dietary data may be correlated with an alimentary label where the element of dietary data and the alimentary label share an origin, such as being data that was collected with regard to a single person or the like. In an embodiment, a first datum may be more closely correlated with a second datum in the same data element than with a third datum contained in the same data element; for instance, the first element and the second element may be closer to each other in an ordered set of data than either is to the third element, the first element and second element may be contained in the same subdivision and/or section of data while the third element is in a different subdivision and/or section of data, or the like. Persons skilled in the art, upon reviewing the entirety of this disclosure, will be aware of various forms and/or degrees of correlation between dietary data and alimentary labels that may exist in training set 104 and/or first data element consistently with this disclosure.

In an embodiment, and still referring to FIG. 1, server 102 may be designed and configured to associate at least an element of a dietary request with a category from a list of significant categories of first dietary request data 106. Significant categories of first dietary request data 106 may include labels and/or descriptors describing types of first dietary request data 106 that are identified as being of high relevance in identifying alimentary process labels 106. As a non-limiting example, one or more categories may identify significant categories of first dietary request data 106 based on degree of relevance to one or more impactful conditions and/or serious adverse events associated with dietary request data. For instance, and without limitation, a particular set of first dietary request data 106 that includes anaphylaxis to shellfish may be recognized as utmost importance for a user to avoid all shellfish containing foods even those foods that may contain hidden ingredients containing shellfish derivatives such as oyster sauce as compared to first dietary request data 106 that includes a dislike of Brussel sprouts, whereby ingestion of Brussel sprouts may not produce an anaphylactic reaction but rather is more indicative of a dislike. As a non-limiting example, and without limitation, first dietary request data 106 describing gluten avoidance such as a gluten intolerance, Celiac Disease, wheat allergy, atopic dermatitis, fructose malabsorption, non-Celiac gluten sensitivity, dermatitis herpetiformis, IgE mediated gluten allergy, IgG mediated gluten sensitivity may be recognized as useful for identifying avoidance of various gluten containing foods and ingredients such as wheat, barley, oats, malt, croutons, corn flakes, couscous, pancakes, beer, brewer's yeast, and flour tortillas. In a further non-limiting example, first dietary request data 106 describing gluten avoidance may be useful for identifying certain categories of foods such as grains, alcoholic beverages, sauces, dressings, baked goods, starches, and the like. Persons skilled in the art, upon reviewing the entirety of this disclosure, will be aware of various additional categories of physiological data that may be used consistently with this disclosure.

Still referring to FIG. 1, server 102 may receive the list of significant categories according to any suitable process; for instance, and without limitation, server 102 may receive the list of significant categories from at least an expert. In an embodiment, server 102 and/or a user device connected to server 102 may provide a graphical user interface 110, which may include without limitation a form or other graphical element having data entry fields, wherein one or more experts, including without limitation clinical and/or scientific experts, may enter information describing one or more categories of dietary data that the experts consider to be significant or useful for detection of conditions; fields in graphical user interface may provide options describing previously identified categories, which may include a comprehensive or near-comprehensive list of types of dietary data detectable using known or recorded testing methods, for instance in "drop-down" lists, where experts may be able to select one or more entries to indicate their usefulness and/or significance in the opinion of the experts. Fields may include free-form entry fields such as text-entry fields where an expert may be able to type or otherwise enter text, enabling expert to propose or suggest categories not currently recorded. Graphical user interface or the like may include fields corresponding to alimentary labels, where experts may enter data describing alimentary labels and/or categories of alimentary labels the experts consider related to entered categories of dietary request data; for instance, such fields may include drop-down lists or other pre-populated data entry fields listing currently recorded alimentary labels, and which may be comprehensive, permitting each expert to select an alimentary label and/or a plurality of alimentary labels the expert believes to be predicted and/or associated with each category of dietary request data selected by the expert. Fields for entry of alimentary labels and/or categories of alimentary labels may include free-form data entry fields such as text entry fields; as described above, examiners may enter data not presented in pre-populated data fields in the free-form data entry fields. Alternatively or additionally, fields for entry of alimentary labels may enable an expert to select and/or enter information describing or linked to a category of alimentary label that the expert considers significant, where significance may indicate likely impact on longevity, mortality, quality of life, or the like as described in further detail below. Graphical user interface 110 may provide an expert with a field in which to indicate a reference to a document describing significant categories of dietary data, relationships of such categories to alimentary labels, and/or significant categories of alimentary labels. Any data described above may alternatively or additionally be received from experts similarly organized in paper form, which may be captured and entered into data in a similar way, or in a textual form such as a portable document file (PDF) with examiner entries, or the like.

With continued reference to FIG. 1, data information describing significant categories of dietary request data, relationships of such categories to alimentary labels, and/or significant categories of alimentary labels may alternatively or additionally be extracted from one or more documents using a language processing module 112. Language processing module 112 may include any hardware and/or software module. Language processing module 112 may be configured to extract, from the one or more documents, one or more words. One or more words may include, without limitation, strings of one or characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, language processing module 112 may compare extracted words to categories of dietary request data, one or more alimentary process labels, and/or one or more categories of alimentary process labels recorded at server 102; such data for comparison may be entered on server 102 as described above using expert data inputs or the like. In an embodiment, one or more categories may be enumerated, to find total count of mentions in such documents. Alternatively or additionally, language processing module 112 may operate to produce a language processing model. Language processing model may include a program automatically generated by server 102 and/or language processing module 112 to produce associations between one or more words extracted from at least a document and detect associations, including without limitation mathematical associations, between such words, and/or associations of extracted words with categories of dietary data, relationships of such categories to alimentary labels, and/or categories of alimentary labels. Associations between language elements, where language elements include for purposes herein extracted words, categories of dietary data, relationships of such categories to alimentary labels, and/or categories of alimentary labels may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of dietary request data, a given relationship of such categories to alimentary process labels, and/or a given category of alimentary process labels. As a further example, statistical correlations and/or mathematical associations may include probabilistic formulas or relationships indicating a positive and/or negative association between at least an extracted word and/or a given category of dietary request, a given relationship of such categories to alimentary process labels, and/or a given category of alimentary process labels; positive or negative indication may include an indication that a given document is or is not indicating a category of dietary request data, relationship of such category to alimentary process label, and/or category of alimentary labels is or is not significant. For instance, and without limitation, a negative indication may be determined from a phrase such as "whole wheat bread was not found to be compatible with a gluten free diet," whereas a positive indication may be determined from a phrase such as "coconut milk was found to be compatible with a lactose free diet" as an illustrative example; whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at server 102, or the like.

Still referring to FIG. 1, language processing module 112 and/or server 102 may generate the language processing model by any suitable method, including without limitation a natural language processing classification algorithm; language processing model may include a natural language process classification model that enumerates and/or derives statistical relationships between input term and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein, are statistical models with inference algorithms that that may be applied to the models. In such models, a hidden state to be estimated may include an association between an extracted word category of dietary data, a given relationship of such categories to alimentary labels, and/or a given category of alimentary labels. There may be a finite number of category of dietary data, a given relationship of such categories to alimentary labels, and/or a given category of alimentary labels to which an extracted word may pertain; an HMM inference algorithm, such as the forward-backward algorithm or the Viterbi algorithm, may be used to estimate the most likely discrete state given a word or sequence of words. Language processing module 112 may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module 112 may use a corpus of documents to generate associations between language elements in a language processing module 112, and server 102 may then use such associations to analyze words extracted from one or more documents and determine that the one or more documents indicate significance of a category of dietary data, a given relationship of such categories to labels, and/or a given category of alimentary labels. In an embodiment, server 102 may perform this analysis using a selected set of significant documents, such as documents identified by one or more experts as representing good science, good clinical analysis, or the like; experts may identify or enter such documents via graphical user interface as described below in reference to FIG. 4, or may communicate identities of significant documents according to any other suitable method of electronic communication, or by providing such identity to other persons who may enter such identifications into server 102. Documents may be entered into server 102 by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, server 102 may automatically obtain the document using such an identifier, for instance by submitting a request to a database or compendium of documents such as JSTOR as provided by Ithaka Harbors, Inc. of New York.

Continuing to refer to FIG. 1, whether an entry indicating significance of a category of dietary data, a given relationship of such categories to alimentary labels, and/or a given category of alimentary labels is entered via graphical user interface, alternative submission means, and/or extracted from a document or body of documents as described above, an entry or entries may be aggregated to indicate an overall degree of significance. For instance, each category of dietary data, relationship of such categories to alimentary labels, and/or category of alimentary labels may be given an overall significance score; overall significance score may, for instance, be incremented each time an expert submission and/or paper indicates significance as described above. Persons skilled in the art, upon reviewing the entirety of this disclosure will be aware of other ways in which scores may be generated using a plurality of entries, including averaging, weighted averaging, normalization, and the like. Significance scores may be ranked; that is, all categories of dietary data, relationships of such categories to alimentary labels, and/or categories of alimentary labels may be ranked according significance scores, for instance by ranking categories of dietary data, relationships of such categories to alimentary labels, and/or categories of alimentary labels higher according to higher significance scores and lower according to lower significance scores. Categories of dietary data, relationships of such categories to alimentary labels, and/or categories of alimentary labels may be eliminated from current use if they fail a threshold comparison, which may include a comparison of significance score to a threshold number, a requirement that significance score belong to a given portion of ranking such as a threshold percentile, quartile, or number of top-ranked scores.

Still referring to FIG. 1, server 102 may detect further significant categories of dietary data, relationships of such categories to alimentary labels, and/or categories of alimentary labels using machine-learning processes, including without limitation unsupervised machine-learning processes as described in further detail below; such newly identified categories, as well as categories entered by experts in free-form fields as described above, may be added to pre-populated lists of categories, lists used to identify language elements for language learning module, and/or lists used to identify and/or score categories detected in documents, as described above.

Continuing to refer to FIG. 1, in an embodiment, server 102 may be configured, for instance as part of receiving the training set 104, to associate at least correlated first alimentary label 110 with at least a category from a list of significant categories of alimentary labels. Significant categories of alimentary labels may be acquired, determined, and/or ranked as described above. As a non-limiting example, alimentary labels may be organized according to relevance to and/or association with a list of significant foods or food groups. A list of significant foods or food groups may include, without limitation, foods having generally acknowledged impact on dietary request. For example, a dietary request such as a grain free diet may be associated with a list of significant foods such as actual grains, grain containing condiments such as ketchup that contains starch thickening agents, grain containing breakfast foods such as pastries and cereals, grain containing frozen foods, grain containing meats and the like.

With continued reference to FIG. 1, server 102 may be configured to receive at least a dietary request from a user device. At least a dietary request may include any of the dietary requests as described above. User device may include any of the user devices as described in more detail below. In an embodiment, at least a dietary request may be received from a computing device. Computing device includes any of the computing devices as described herein. In an embodiment, server 102 may receive at least a dietary request from a computing device such as when server 102 may receive at least a dietary request from a nutrition plan and computing device may generate one or more dietary requests that may match requested nutrition values as established in nutritional plan.

With continued reference to FIG. 1, server 102 may include an alimentary instruction label learner 114, the alimentary instruction label learner 114 designed and configured to generate a correlated alimentary process label based on an alimentary data output 816. Alimentary instruction label learner 114 may include any hardware and/or software module. Alimentary instruction label learner 114 is designed and configured to generate outputs using machine learning processes. A machine learning process is a process that automatedly uses a body of data known as "training data" and/or a "training set" to generate an algorithm that will be performed by a computing device/module to produce outputs given data provided as inputs; this is in contrast to a non-machine learning software program where the commands to be executed are determined in advance by a user and written in a programming language.

Still referring to FIG. 1, alimentary instruction label learner 114 may be designed and configured to generate at least an alimentary instruction set by creating at least a first machine-learning model 116 relating first dietary request data 106 to alimentary labels using the training set 104 and generating the at least an alimentary instruction set using the first machine-learning model 116; at least a first machine-learning model 116 may include one or more models that determine a mathematical relationship between first dietary request data 106 and alimentary labels. As described here, an alimentary instruction set is a data structure containing a solution and/or suggestion as to nourishment requirements and/or preferences contained within at least a dietary request. Alimentary instruction set may include meals, foods, food groups, ingredients, supplements and the like that may be compatible with at least a dietary request. For example, alimentary instruction set may include a list of three possible meals that may be compatible with at least a dietary request for a dairy free diet. In yet another non-limiting example, alimentary instruction set may include food groups compatible with at least a dietary request such as a dietary request for a paleo diet may include recommendations as to food groups that are compatible including meats, fish, poultry, fats, vegetables, and fruits. Machine-learning models may include without limitation model developed using linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

With continued reference to FIG. 1, machine-learning algorithms may generate alimentary instruction sets as a function of a classification of at least an alimentary label. Classification as used herein includes pairing or grouping alimentary labels as a function of a shared commonality. Classification may include for example, groupings, pairings, and/or trends between dietary data and current alimentary label, future alimentary label, and the like. In an embodiment, machine-learning algorithms may examine relationships between a future propensity of a user to require a new alimentary instruction set based on current dietary data. Machine-learning algorithms may include any and all algorithms as performed by any modules, described herein for alimentary instruction label learner 114. For example, machine-learning algorithms may relate a dietary request such as a grain free diet to a user's future propensity to require an alimentary instruction set containing a recommendation to consume high fiber foods. Machine-learning algorithms may examine precursor dietary requests and future propensity to report a subsequent dietary request. For example, machine-learning algorithms may examine a user dietary request for a gluten free diet with a future propensity to report a subsequent dairy free diet. In yet another non-limiting example, machine learning algorithms may examine varying degrees of dietary requests and restrictions. For example, machine-learning algorithms may examine a user dietary request for Atkins diet with a future propensity to report a less restrictive dietary request such as the South Beach Diet. In yet another non-limiting example, machine-learning algorithms may examine a user dietary request for a gluten free diet with a future propensity to report a more restrictive dietary request such as a ketogenic diet. Machine-learning algorithms may examine a user dietary request for vegetarian diet with a future propensity to report a request for a vegan diet. Machine-learning algorithms may examine degree of dietary restriction requests and development of food allergies over time. For example, machine-learning algorithms may examine a user dietary request for an elimination diet with a future propensity to report a less restrictive diet as foods are reintroduced. Machine-learning algorithms may examine dietary requests by categories, such as demographics including geographic location, age, sex, marital status, profession, income, and the like. For example, machine learning algorithms may examine user dietary requests in California versus user dietary requests in Maine. Machine-learning algorithms may examine dietary requests including several categories such as user dietary requests in men between the ages of 45-55 in Alaska versus user dietary requests among females age 18-24 in Alabama. Machine-learning algorithms may examine trends among dietary requests generated such as for example, a dietary request by a user for vegetarian options and subsequent requests by the user for carnivore dietary requests.

Continuing to refer to FIG. 1, machine-learning algorithm used to generate first machine-learning model 116 may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors' algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Still referring to FIG. 1, alimentary instruction label learner 114 may generate alimentary instruction set using alternatively or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using training set 104; the trained network may then be used to apply detected relationships between elements of first dietary request data 106 and alimentary labels.

With continued reference to FIG. 1, machine-learning algorithms may include unsupervised processes; unsupervised processes may, as a non-limiting example, be executed by an unsupervised learning module executing on server 102 and/or on another computing device in communication with server 102, which may include any hardware or software module as described as described herein. An unsupervised machine-learning process, as used herein, is a process that derives inferences in datasets without regard to labels; as a result, an unsupervised machine-learning process may be free to discover any structure, relationship, and/or correlation provided in the data. For instance, and without limitation, alimentary instruction label learner 114 and/or server 102 may perform an unsupervised machine learning process on training set 104, which may cluster data of training set 104 according to detected relationships between elements of the training set 104, including without limitation correlations of elements of first dietary request data 106 to each other and correlations of alimentary labels to each other; such relations may then be combined with supervised machine learning results to add new criteria for alimentary instruction label learner 114 to apply in relating first dietary request data 106 to alimentary labels. As a non-limiting, illustrative example, an unsupervised process may determine that a first element of dietary data closely with a second element of dietary data, where the first element has been linked via supervised learning processes to a given alimentary label, but the second has not; for instance, the second element may not have been defined as an input for the supervised learning process, or may pertain to a domain outside of a domain limitation for the supervised learning process. Continuing the example a close correlation between first element of first dietary request data 106 and second element of first dietary request data 106 may indicate that the second element is also a good predictor for the alimentary label; second element may be included in a new supervised process to derive a relationship or may be used as a synonym or proxy for the first dietary data by alimentary label learner 114.

Still referring to FIG. 1, server 102 and/or alimentary instruction label learner 114 may detect further significant categories of dietary data, relationships of such categories to alimentary labels, and/or categories of alimentary labels using machine-learning processes, including without limitation unsupervised machine-learning processes as described above; such newly identified categories, as well as categories entered by experts in free-form fields as described above, may be added to pre-populated lists of categories, lists used to identify language elements for language learning module, and/or lists used to identify and/or score categories detected in documents, as described above. In an embodiment, as additional data is added to system 100, alimentary instruction label learner 114 and/or server 102 may continuously or iteratively perform unsupervised machine-learning processes to detect relationships between different elements of the added and/or overall data. Use of unsupervised learning may greatly enhance the accuracy and detail with which system may detect alimentary labels.

With continued reference to FIG. 1, unsupervised processes may be subjected to domain limitations. For instance, and without limitation, an unsupervised process may be performed regarding a comprehensive set of data regarding one person, such as demographic information including age, sex, race, geographical location, profession, and the like. As another non-limiting example, an unsupervised process may be performed on data concerning a particular cohort of persons; cohort may include, without limitation, a demographic group such as a group of people having a shared age range, ethnic background, nationality, sex, and/or gender. Cohort may include, without limitation, a group of people having a shared value for an element and/or category of dietary data, a group of people having a shared value for an element and/or category of alimentary label, and/or a group of people having a shared value and/or category of alimentary label; as illustrative examples, cohort could include all people requesting a gluten free diet, all people requesting a dairy free diet, all people requesting a grain free diet, all people requesting a vegetarian diet or the like. Persons skilled in the art, upon reviewing the entirety of this disclosure, will be aware of a multiplicity of ways in which cohorts and/or other sets of data may be defined and/or limited for a particular unsupervised learning process.

Still referring to FIG. 1, alimentary instruction label learner 114 may alternatively or additionally be designed and configured to generate an alimentary instruction set by executing a lazy learning process as a function of the training set 104 and the at least a dietary request; lazy learning processes may be performed by a lazy learning module executing on server 102 and/or on another computing device in communication with server 102, which may include any hardware or software module. A lazy-learning process and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover a "first guess" at an alimentary label associated with a dietary request, using training set 104. As a non-limiting example, an initial heuristic may include a ranking of alimentary labels according to relation to a test type of at least a dietary request, one or more categories of dietary data identified in test type of at least a dietary request, and/or one or more values detected in at least a dietary request; ranking may include, without limitation, ranking according to significance scores of associations between elements dietary data and alimentary labels, for instance as calculated as described above. Heuristic may include selecting some number of highest-ranking associations and/or alimentary labels. Alimentary instruction label learner 114 may alternatively or additionally implement any suitable "lazy learning" algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate alimentary outputs as described in this disclosure, including without limitation lazy learning applications of machine-learning algorithms as described in further detail below.

Continuing to refer to FIG. 1, alimentary instruction label learner 114 may generate a plurality of alimentary labels having different implications for a particular person. For instance, where the at least a dietary request includes a request for a gluten free diet, alimentary instruction sets may be consistent with recommendations for meals containing grains such as rice, quinoa, teff, millet, buckwheat, amaranth, sorghum and the like. In such a situation, alimentary instruction label learner 114 and/or server 102 may perform additional processes to resolve ambiguity. Processes may include presenting multiple possible results to a user, informing the user that one or more dietary preferences are needed to determine a more definite alimentary label, such as a user preference for a gluten free grain of quinoa over millet. Alternatively or additionally, processes may include additional machine learning steps; for instance, where reference to a model generated using supervised learning on a limited domain has produced multiple mutually exclusive results and/or multiple results that are unlikely all to be correct, or multiple different supervised machine learning models in different domains may have identified mutually exclusive results and/or multiple results that are unlikely all to be correct. In such a situation, alimentary instruction label learner 114 and/or server 102 may operate a further algorithm to determine which of the multiple outputs is most likely to be correct; algorithm may include use of an additional supervised and/or unsupervised model. Alternatively or additionally, alimentary instruction label learner 114 may perform one or more lazy learning processes using a more comprehensive set of user data to identify a more probably correct result of the multiple results. Results may be presented and/or retained with rankings, for instance to advise a user of the relative probabilities of various alimentary labels being correct; alternatively or additionally, alimentary labels associated with a probability of correctness below a given threshold and/or alimentary labels contradicting results of the additional process, may be eliminated. As a non-limiting example, a dietary request for a vegetarian diet may lead to animal containing meat products such as beef, chicken, and lamb from being eliminated from a list of alimentary labels for a user while alimentary labels containing animal derived dairy products such as yogurt, cheese, and milk may be retained. Similarly, a dietary request for a vegan diet may eliminate all animal derived products but retain all plant sourced products including tofu, soybeans, beans, seitan, tempeh, lentils, and the like. Persons skilled in the art, upon reviewing the entirety of this disclosure, will be aware of various ways in which additional processing may be used to determine relative likelihoods of alimentary labels on a list of multiple alimentary labels, and/or to eliminate some labels from such a list. Alimentary instruction set may be provided to user output device as described in further detail below.

With continued reference to FIG. 1, system 100 includes an alimentary instruction set generator module operating on the at least a server. The alimentary instruction set generator module may include any hardware and/or software module as described in this disclosure. Alimentary instruction set generator module is designed and configured to generate at least an alimentary instruction set as a function of the at least a dietary request and the training data. In an embodiment, alimentary instruction set 120 is a data structure containing a solution and/or suggestion to nourishment requirements as requested in the at least a dietary request. Alimentary instruction set may contain suggestions as to foods and/or meals that a user may consume that may meet requirements and/or specifications of at least a dietary request. For example, at least a dietary request containing a request for a dairy free diet may be utilized to generate an alimentary instruction set that includes a suggestion for breakfast that includes oatmeal topped with coconut milk. In yet another non-limiting example, at least a dietary request for a vegetarian diet may be utilized to generate an alimentary instruction set that includes a meal containing tofu, spinach, and rice. In an embodiment, alimentary instruction set generator module may be configured to modify alimentary instruction set as a function of the at least a user entry as described in more detail below.

With continued reference to FIG. 1, alimentary instruction set 120 may be generated upon receiving at least an element of user data including a constitutional restriction. Element of user data as used herein, is any element of data describing the user, user needs, and/or user preferences. At least an element of user data may include a constitutional restriction. At least a constitutional restriction may include any constitutional reason that a user may be unable to engage in an alimentary instruction set process; at least a constitutional restriction may include a contraindication such as an injury, a diagnosis such as by an informed advisor including a functional medicine doctor, an allergy or food sensitivity issue, a contraindication due to a medication or supplement that a user may be taking. For example, a user diagnosed with a hypercholesteremia and currently taking a cholesterol lowering medication such as a statin may report a constitutional restriction that includes an inability to consume foods and food products containing grapefruit.

With continued reference to FIG. 1, alimentary instruction set may be generated upon receiving at least an element of user data including at least a user preference. At least a user preference may include, without limitation, any preference to engage in or eschew any alimentary instruction set process. At least a user preference may include for example religious preferences such as forbidden foods, medical interventions, exercise routines and the like. For example, a user who is of Catholic faith may report a religious preference to not consume animal products on Fridays during lent. At least a user preference may include a user's dislike such as for example a user aversion to certain foods or nutrient groups, such as for example an aversion to eggs or an aversion to beets. At least a user preference may include for example a user's likes such as a user's preference to consume animal products or full fat dairy and the like. In an embodiment, alimentary instruction set 120 may be transmitted by alimentary instruction set module 118 to a user such as to a user client device 134, utilizing any of the transmission methodologies as described herein any network transmissions.

With continued reference to FIG. 1, server 102 includes transport request generator module 122. Transport request generator module 122 may include any hardware and/or software module. Transport request generator module 122 is designed and configured to generate transport request 124 as a function of dietary request data 106 and training data. Transport request 124 as used herein is a data structure or any other compilation of data accurately describing a set of alimentary components based on dietary required eliminations associated with a user, which may include a plurality of constraints relating to factors associated with transporting alimentary components such as, but not limited to, scheduling, transport methods, alimentary component ripeness, projected alimentary component quality upon arrival, or any other factors relating to alimentary components. In an embodiment, transport request 124 may be based on alimentary instruction set 120, which may include a plurality of performances configured to be associated with alimentary components. In an embodiment, transport request 124 may include performances 210-16 which are ultimately received and processed by an applicable executor. For example, a user's dietary request may eliminate or seek to avoid all fruits exceeding a threshold sugar content. Transport request 124 based on the dietary request may include multiple performances each of which reflecting a transport request for distinct fruits that do not exceed the threshold sugar content. In an embodiment, transport request 124 may include a compilation of alimentary component orders each of which configured to be processed by a distinct physical performance entity. For example, transport request 124 may include a first order for fruit to be processed by a fresh fruit vendor, a second order for meat to be processed by a butcher, and a third order for lavender to be processed by a horticulturist, all of which may be collected and transported by the same or distinct physical performance entities. In an embodiment, transport request 124 may include a compilation of tasks necessary to be fulfilled by a user or a physical performance entity on behalf of a user received by user client device 134 associated with the user or physical performance entity. Transmission may occur utilizing any of the transmission methodologies as described herein including any network transmission.

With continued reference to FIG. 1, transport request 124 may generated as a function of user geolocation associated with user client device 134. User location including geographic location of a user may be utilized to generate transport request 124 that may contain orders including ingredients or selections that may be available to a user in a certain geographical location. For example, a user with an alimentary instruction set that contains a recommendation to consume dairy products may receive transport request 124 including an order for yogurts produced within a certain radius of the geolocation. In another example, a user located within North Dakota associated with an alimentary instruction set that contains a recommendation to consume alimentary components rich in antioxidants may receive transport request 124 including an order for North Dakota locally farmed honey. In an embodiment, transport request generator module 122 may acquire data, micro-analytics, or any other relevant data via processes such as web scraping performed on user client device 134 in order to discover preferences that may align with alimentary instruction set 120 to assist in the generation of transport request 124. For example, if a user commonly performs searches on web engines for keto snacks then transport request generator module 122 may generate transport request 124 including keto snacks manufactured by or otherwise associated with physical performance entities within the geolocation of user client device 134.

With continued reference to FIG. 1, transport request generator module 122 may include transport request learner 126. Transport request learner 126 may contain any hardware or software module suitable for use as alimentary instruction label learner 114 as described above. Transport request learner 126 may include a machine-learning module as described above, transport request learner 126 may perform any machine-learning process or combination of processes suitable for use by alimentary instruction label learner 114 as described above. For instance and without limitation, transport request learner 126 may be configured to create a second machine-learning model 128 relating transport requests to alimentary process labels and/or user entries containing an alimentary transport request action. Second machine-learning model 128 may be generated according to any process, process steps, or combination of processes and/or process steps suitable for creation of first machine-learning model. In an embodiment, transport request learner 126 may use data from training set 104; for instance, transport request learner 126, may use lazy learning via lazy learning module 812 and/or model generation to determine relationships between elements of dietary data, in combination with or instead of alimentary labels. Subsequent transport requests may be generated based on trends and data collected from user entries. User entries that contain trends and/or repeat habits established by a user may be utilized in machine-learning algorithms to generate subsequent transport requests. For example, a user's purchase history or frequency for a specific type of product may be utilized by subsequent transport requests including the product.

With continued reference to FIG. 1, system 100 may include a client-interface module 152. Client-interface module 152 may include any suitable hardware or software module. Client-interface module 152 may designed and configured to transmit alimentary instruction set to at least a user client device 134 associated with the user. A user client device 134 may include, without limitation, a display in communication with server 102; display may include any display as described herein. A user client device 134 may include an addition computing device, such as a mobile device, laptop, desktop computer, or the like. Output may be displayed on at least a user client device 134 using an output graphical user interface.

Figure 2:
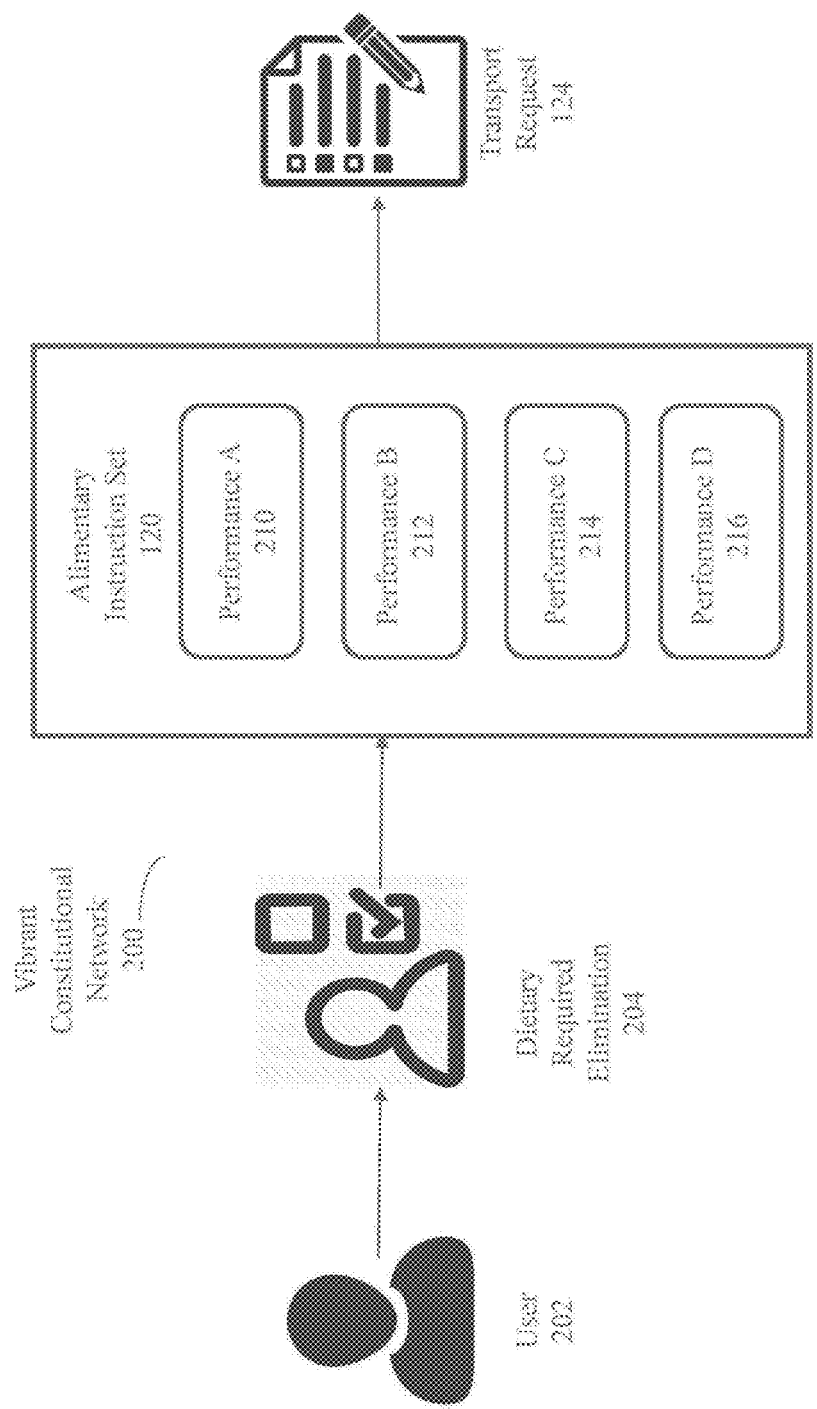
FIG. 2 is a block diagram illustrating an exemplary embodiment of a network for transport of alimentary components based on dietary required eliminations.

Referring now to FIG. 2, a vibrant constitutional network 200 within system 100 is presented. Network 200 may include one or more users 202 who may interact with system 100. In application, a dietary required elimination 204 is collected from user 202 via user inputs into user client device 134 or any other relevant source including dietary required elimination of user 202 and one or more analyses are performed on dietary required elimination 204 which may be result in alimentary instruction set 120 being generated including performances 210-216 reflecting alimentary components based on the at least a dietary request or transport request module generator 122 may utilize the one or more analyses directly to generate transport request 124. As described herein, a transport request may be, but is not limited to, any compilation of data associated with the picking up, transporting, and delivery of movable goods associated with a user within a vibrant constitutional network. In an embodiment, transport request 124 may be generated by a transport request generator module operating on at least a server 102, which may be configured to generate transport request 124 as a function of a dietary request received from a user device and/or training data. In an embodiment, transport request 124 may reflect information sourced from user 202 provided to a user interface of a computing device associated with vibrant constitutional network 200. In one embodiment, alimentary instruction set 120 is generated by an alimentary instruction set generator module configured to receive a plurality of alimentary information relating to user 202 derived from dietary required elimination 204. Information contained in alimentary instruction set 124 may be supplemented by one or more creditable sources either within or outside of network 200.

In one embodiment, and still viewing FIG. 2, alimentary instruction set 120 may reflect an applicable solution to nourishment requirements, deficiencies, and other applicable factors. Alimentary instruction set 120 may include performances 210-216 configured to reflect a plurality of performances associated with alimentary components of alimentary instruction set 120 and configured to be arranged and implemented via the execution of transport request 124. For example, alimentary instruction set 120 may comprise a component seeking to remedy a vitamin deficiency of user 202. Based on this component, alimentary instruction set 120 may account for the alimentary component associated with performance A 210 by transmitting a plurality of executable instructions to transport request generator module 122 that result in the generated transport request 124 including alimentary components, such as fruits, vitamins, or supplements to remedy the deficiency of user 202. As a non-limiting example, performances 210-216 may include enlistment of one or more applicable professionals configured to counsel, support, or mentor user 202 regarding applicable areas further configured to interact with transport request generator module 122.

Figure 3:
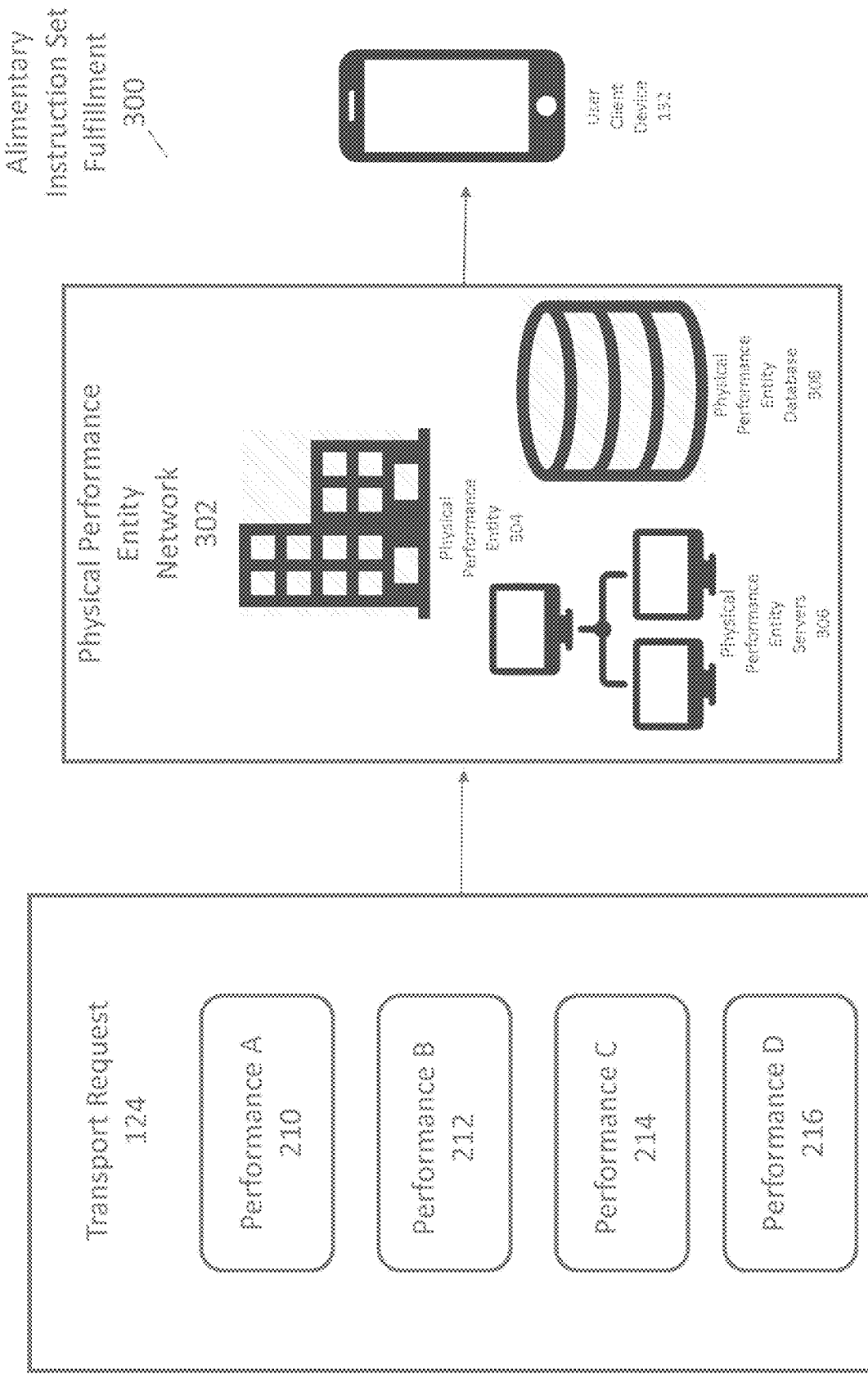
FIG. 3 is a block diagram illustrating an exemplary embodiment of a physical performance entity fulfilling a transport request.

Referring now to FIG. 3, an alimentary instruction set fulfillment network 300 within vibrant constitutional network 200 is presented. In an embodiment, an alimentary instruction set fulfillment network 300 may be referred to as enacting a transport request process where alimentary instruction set 208 may be directly interchanged with a transport request 124 including user information and other information pertaining to dietary required elimination 204. In an embodiment, transport request generator 122 may function as an alimentary instruction set module 118 for the purpose of utilizing the outputs of one or more machine learning processes, developing performances 210-216 based on those outputs, and generating transport request 124 based off of components of performances 210-216. Fulfillment network 300 is may include performances 210-216 reflecting orders included within transport request 124 configured to be executed by a physical performance entity network 302. Physical performance entity network 302 may include at least a physical performance entity 304, which may include any physical performance executor as described in further detail below, a plurality of physical performance entity servers 306, and a physical performance entity database 308. Each server of physical performance entity servers 306 may include any computing device suitable for use as at least a server 102. Physical performance entity database 308 may include any database or datastore as described in this disclosure. Although only a single physical performance entity network 302 is depicted, fulfillment network 300 may be configured to involve multiple physical performance entity networks or various performances within a particular physical performance entity network 302 when applicable. In one embodiment, transport request may represent performances 210-216 so that each may be accounted for to a different physical performance entity network 302 associated with different physical performance entities 304 respectively. For example, transport request 124 may account for performance A 210 which may be a component of alimentary instruction set 208 configured to transmit instructions to a first physical performance entity network 302 relating to an order for specific groceries necessary for a proposed meal plan of alimentary instruction set 208 that specifically accounts for alimentary components that avoid a gluten-intolerance associated with dietary required elimination 204, account for performance B 212 which may be an alimentary component of alimentary instruction set 208 configured to transmit instructions to a second physical performance entity network 302 relating to an order for non-citrus fruits based on allergic reactions of user 202 to citrus fruits derived from dietary required elimination 204, account for performance C 214 which may be a component of alimentary instruction set 208 configured to transmit instructions to a third physical performance entity network 302 relating to an order for a specific alimentary component based on the geolocation of user 202 and the proximity to the manufacturer or supplier within a close proximity to the geolocation, and account for performance D 216 which may be an order including transmittable instructions to a fourth physical performance entity network 302 relating an alimentary component such as garlic being processed because it the springtime when allergens are rampant.

Figure 4:
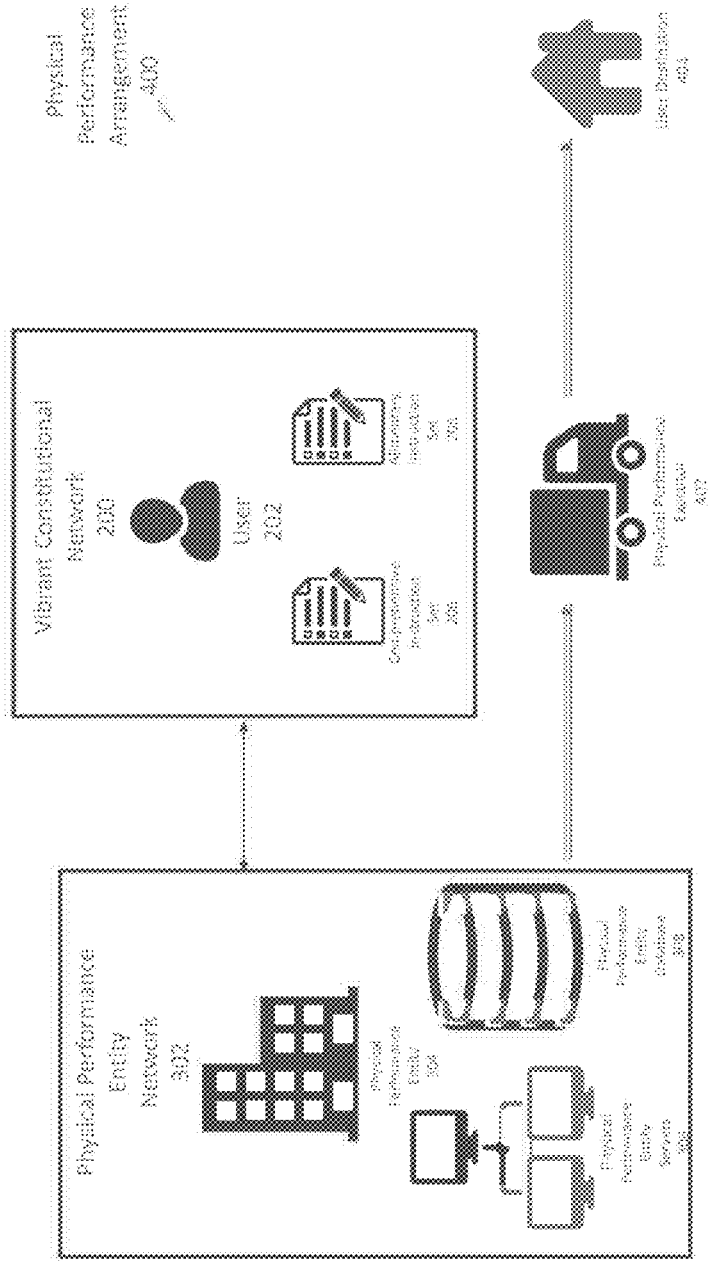
FIG. 4 is a block diagram illustrating an exemplary embodiment of implementation of a physical performance arrangement associated with a user.

Referring now to FIG. 4, a schematic diagram of an implementation arrangement for physical performance arrangement 400 based on the transport request 206 or in an embodiment alimentary instruction set 208 within vibrant constitutional network 200 is presented. Physical performance arrangement 400 may be configured and/or arranged to include transmissions and occurrence by and between components of vibrant constitutional network 200 and components of physical performance entity network 302 in order to ensure that physical performance arrangement 400 is successfully implemented. Physical performance arrangement 400 may be further configured to include a physical performance executor 402 that is configured to, either automatically or via election by user 202, deliver or support reception of components of transport request 206 or alimentary instruction set 208 via a user destination 404 associated with user 202. In one embodiment, physical performance executor 402 may be a component of physical performance entity network 302 or a third-party provider that is elected by vibrant constitutional network 200, user 202, or physical performance entity 304. In an embodiment, user destination 404 may be determined by at least a server 102 including a global positioning system configured to determine the current location of the user 202. For example, user 202 may provide extraction 204 in a specific location, and the specific location is acquired by the global positioning system in order to automatically select physical performance entity network 302 that is within a threshold distance to the specific location. In an embodiment, the global positioning system may be a user device, computing device, or other satellite communication methods, motion tracking with devices' motion sensors (IMUs, etc.), cell tower signal contact, or any other effective means of global positioning functionality.

In one embodiment, and still referring to FIG. 4, user destination 404 is determined based on the specific location of user 202 acquired from the global positioning system. In an embodiment, user destination 404 may be determined based on inputs of user 202 into user client device 132. Physical performance entity network 302 or physical performance executor 402 may be selected by at least a server 102 based on the specific location acquired from the global positioning system or the user destination 404 established by information sourced from vibrant constitutional network 200 or information provided by user 202 to user client device 132.

In one embodiment, and still referring to FIG. 4, physical performance executor 402 may be any transportation channel including, but not limited to, Amazon, Grubhub, DoorDash, Postmates, Seamless, Uber, EatStreet, FedEx, UPS, Instacart, or any other channel configured to process and execute requests related to nourishment or supplements. In application, physical performance entity network 302 is configured to receive, via at least a server 102, a physical performance instruction set associated with respective performances 210-216 along with a plurality of information comprised within vibrant constitutional network 200 that may or may not be included in alimentary instruction set 208. For example, information pertaining to user 202 may include, but is not limited to, remittance information, preferred remittance methods, one or more physical addresses, telephone numbers, e-mail, and any other applicable information relating to user 202. In one embodiment, the plurality of information may be stored and accessed in physical performance entity database 308 based on a previous session or interaction between user 202 and physical performance entity 304. In an embodiment, the at least a server 102 is configured to transmit a subsequent transport request 206 based on the transport request 206 previously transmitted to physical performance entity 304. Transport request 206 including components of performances 210-216 based on dietary required elimination 204 is configured to be transmitted to a client device (not shown) associated with one or more physical performance entities 302 resulting in the one or more physical performance entities 302 providing a plurality of constraints based on transport request 206, user preference data, dietary required elimination 204, and any other relevant data provided to the one or more physical performance entities 302 by the at least a server 102. The plurality of constraints may include, but are not limited to, performance limitations associated with physical performance entity 302 based on the performance capacity of physical performance entity 302, available or unavailable resources necessary for physical performance entity 302 to execute components of performances 210-216, scheduling conflicts, proximity of physical performance entity 302 to user destination 404, dietary constraints of user 202 provided by vibrant constitutional network 200, or any other applicable limitations associated with physical performance entity 302. In one embodiment, user 202 may manually perform the physical performance instruction set via picking up components of alimentary instruction set 208 from physical performance entity 304, physical performance executor 402, or any other applicable source. In an embodiment, physical performance entity 304 provides the at least a server 102 with the plurality of constraints resulting in the at least a server 102 being configured to make a determination pertaining to whether or not physical performance entity 304 includes the ability to execute transport request 206 and transport alimentary components included within transport request 206.

In one embodiment, and still referring to FIG. 4, the plurality of constraints are received and utilized via at least a server 102 in order to select one or more optimal handlers that are able to execute the physical performance instruction set as a function of the plurality of constraints. In an embodiment, user preference data provided by user 202 via user client device 132 or extracted from vibrant constitutional network may be transmitted by at least a server 102. For example, the at least a server 102 is configured to transmit user preference data to and subsequently select physical performance entity 304, physical performance executor 402, or one more optimal handlers configured to execute transport request 206 based on the diagnostic output in combination with information entered by user 202 on a computing device and/or information included in vibrant constitutional network 200. As described herein, an optimal handler may include but is not limited to an elected or designated physical performance entity 304 or physical performance executor 402 that is able to most accurately align its own limitations or constraints with those of user 202 or transport request 206 in order to efficiently carry out physical performance arrangement 400. For example, if transport request 206 specifies that user 202 requires specific alimentary components within the next hour from a source within 3 miles of a specific zip code, the plurality of constraints associated with each respective physical performance entity 304 are utilized to determine which physical performance entity 304 is an optimal handler based on the plurality of constraints that conform to the specific requirements of transport request 206. Once the optimal handler is selected based on the most conformity between the plurality of constraints and requirements/preferences of user 202, at least a server 102 is configured to transmit a subset of data associated with user 202 to the physical performance entity network 302 associated with the selected optimal handler. In one embodiment, the subset of data may be data comprised within vibrant constitutional network 200 such as preferred options associated with physical performance executor 402, physical address associated with user destination 404, or any other data configured to assist physical performance entity 304 with physical performance arrangement 400.

In one embodiment, and continuing to refer to FIG. 4, the optimal handler may be selected based on one or more preferences associated with user 202 via user input provided to vibrant constitutional network 200 or physical performance entity network 302. In an embodiment, the one or more preferences may be included in transport request 206. The optimal handler may also be designated via a process of elimination based on data within transport request 206 and the availability of physical performance entity 304. For example, if more than one physical performance entity 304 is available to execute the physical performance instruction set, then the physical performance entity 304 comprising the least constraints or conforms the most with the physical performance instruction set is determined the optimal handler. In one embodiment, more than one physical performance entity 304 may be determined as the optimal handler resulting in various components of the physical performance instruction set being allocated accordingly across the selected optimal handlers. In an embodiment, at least a server 102 is configured to determine an ability of the physical performance entity network 302 or physical performance executor 402 to execute transport request 206 based on components of transport request 206 and/or user preference data. For example, transport request 206 may include data relating to a preference of user 202 to have one or more alimentary components transported via a specified manner during a specified time-frame, in which may be utilized by at least a server 102 in the determination of the ability of physical performance entity network 302 or physical performance executor 402 to execute transport request 206.

Still referring to FIG. 4, selection of an optimal handler may be performed by reference to geographical constraints. For instance, and without limitation, optimal handler may be selected from among physical performance entities by determining a distance from a user, a travel time to arrive at a user, or the like, for each of a plurality of physical performance entities; plurality may be selected according to any criteria described in this disclosure. Selection of optimal handler may further include selection of a physical performance entity minimizing a travel time, travel distance, delivery time, or the like to user. For instance, and without limitation, a physical performance entity 304 capable of arriving at a user location the soonest may be selected. Travel time, distance, and the like may alternatively or additionally be compared to a threshold amount, such as a maximal travel time and/or distance set by system 100 and/or in user preferences as received and/or recorded according to this disclosure. Travel time and/or distance may be determined by reference to a location of a physical performance entity 304 which may be static, such as a recorded address, and/or dynamic, such as a location of a computing device and/or mobile device operated by physical performance entity 304, a vehicle or employee thereof, or the like via global positioning service (GPS) or other navigation facilities.

With continued reference to FIG. 4, in one embodiment, at least a server 102 may be configured to retrieve data from user client device 132, such as geolocation of user 202, browsing history metadata, and other applicable data comprised on user client device in order to assist with the selection of one or more optimal handlers. At least a server 102 may be configured to establish a communication session between user 202 and physical performance executor 402 via user client device 132, which may be hosted by vibrant constitutional network 200 in order to supplement data associated with user destination 404 to ensure physical performance arrangement 400 is completed. In one embodiment, physical performance entity 304 or physical performance executor 402 may be an entity configured to process and package physical performance instruction sets, transport request, and other combinations of alimentary components which are configured to support on-site pick-up of components of alimentary instruction set 208.

With continued reference to FIG. 4, in one embodiment, at least a server 102 receives at least a dietary request associated with user 202 based off of one or more analyses relating to dietary required elimination 204 derived from vibrant constitutional network 200 or inputs provided by user 202 to user client device 134. For illustrative purposes, user 202 operating on user client device 134 supplies vibrant constitutional network 200 with dietary required elimination 204. For example, user 202 may indicate that user 202 requests that her diet be vegetarian and vegan. Dietary required elimination 204 functions as a data structure that includes the requests of user 202. In an embodiment, components of dietary required elimination 204 may be housed in first dietary request data 106 and received by at least a server 102 within training data rooted from training set 104. One or more machine learning processes are performed on the training data including dietary required elimination 204 resulting in alimentary instruction set 120 being generated by alimentary instruction set module 118 or transport request generator module 122 receiving outputs of the machine learning processes directly in order to generate transport request 124 that directly reflects dietary required elimination 204. In one example, user 202 may specify dietary required elimination 204 reflecting a request for a kosher diet, utilizing the processes disclosed above, alimentary instruction set 120 may be generated including performance A 210 reflecting an order for kosher meats to be processed by a nearby butcher based on the geolocation of user client device 134, performance B 212 reflecting an order for organic kosher milk to be processed by a nearby applicable supplier, performance C 214 reflecting an order for kosher fish (tuna, salmon, herring) and excluding non-kosher fish such as shellfish with a local fish market, and performance D 216 reflecting an order for wines free of gelatin, casein, and bull blood with a local winery or applicable merchant. Transport request generator module 122 utilizes, via from the machine learning process directly or through alimentary instruction set module 118, data comprised within performances 210-216 in order to generate transport request 124 encompassing the previously mentioned orders associated with performances 210-216. Physical performance entity network 302 is configured to receive and process transport request 124 in order to search and designate one or more physical performance entities 304 based on the geolocation of user 202 configured to execute the components of transport request 124. Referring to the previous example, performances 210-216 may be configured to be executed by multiple physical performance entities 304 or via any other configuration that allows performances 210-216 to be executed efficiently. In an embodiment, orders associated with 210-216 may be executed by each applicable respective physical performance entity 304, allowing physical performance executor 402 to execute transport request 124 by picking up each order associated with performances 210-216 and effectively delivering orders to user destination 404. In an embodiment, physical performance entity 304 and/or physical performance executor 402 are configured to send consistent updates, tracking status, or live coverage of transport request 124 to user 202 via user client device 134. Live coverage may include but is not limited to sensors, cameras, Radio Frequency Identification (RFID), Geographic Information Systems (GIS), Wireless Local Area Network (WLAN), or any other applicable type of method for accounting for the status and position of an item.

Figure 5:
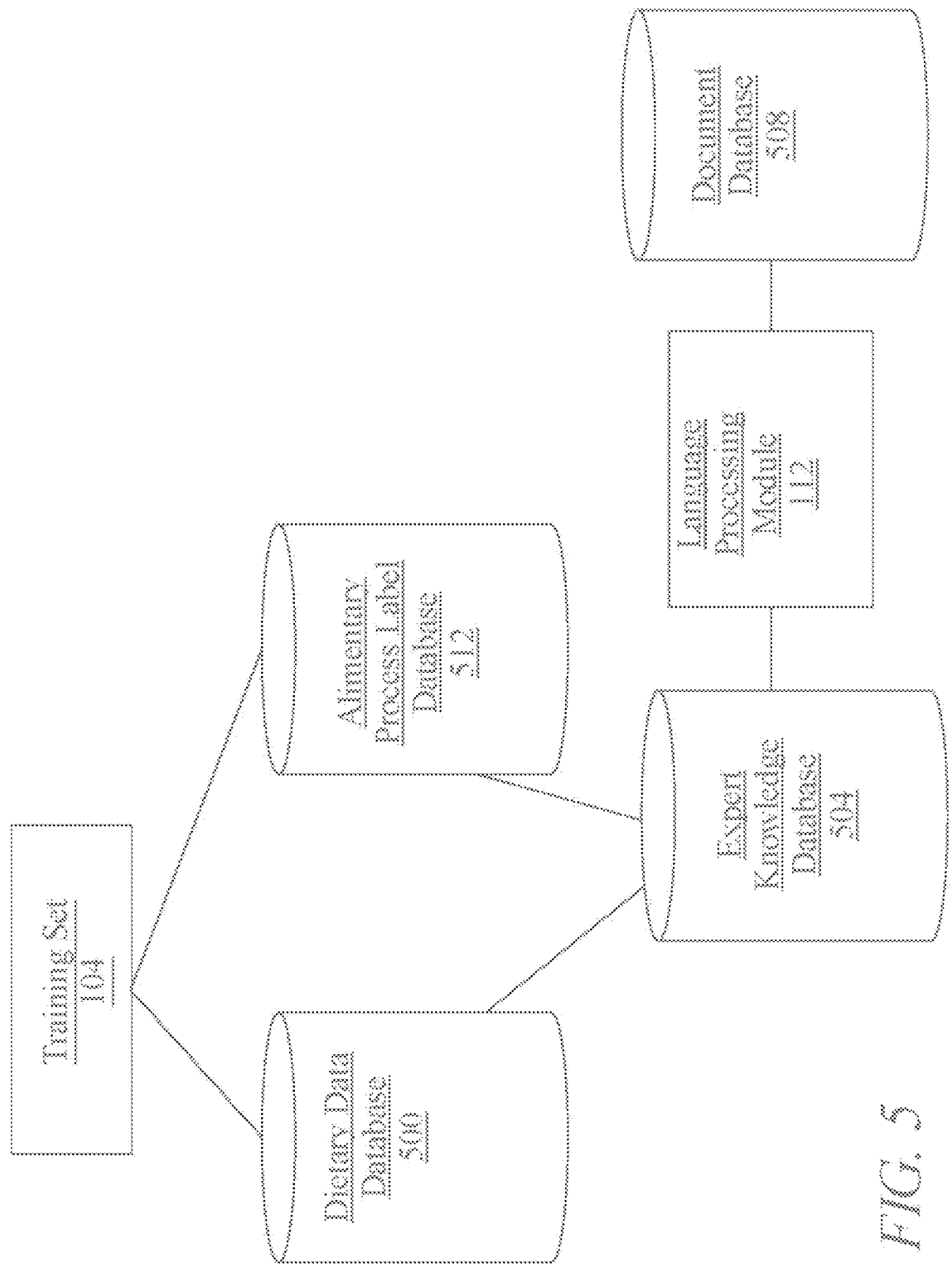
FIG. 5 is a block diagram illustrating embodiments of data storage facilities for use in disclosed systems and methods.

Referring now to FIG. 5, data incorporated in training set 104 and/or may be incorporated in one or more databases. As a non-limiting example, one or elements of dietary data may be stored in and/or retrieved from dietary data database 500. A dietary data database 500 may include any data structure for ordered storage and retrieval of data, which may be implemented as a hardware or software module. A dietary data database 500 may be implemented, without limitation, as a relational database, a key-value retrieval datastore such as a NOSQL database, or any other format or structure for use as a datastore that a person skilled in the art would recognize as suitable upon review of the entirety of this disclosure. A dietary data database 500 may include a plurality of data entries and/or records corresponding to elements of dietary data as described above. Data entries and/or records may describe, without limitation, data concerning particular dietary requests that have been collected; entries may describe particular foods and/or ingredients that are compatible with one or more dietary requests, which may be listed with related alimentary labels. For example, a dietary request for a gluten free diet and an unrelated dietary request for a Mediterranean diet may both may both be compatible with ingredients that include wild fish, grains such as buckwheat, polenta, and millet, and fresh vegetables such as kale, spinach, and tomatoes. Data entries may include alimentary labels and/or other descriptive entries describing results of evaluation of past dietary requests, including alimentary labels that were associated with conclusions regarding likelihood of future dietary requests associated with an initial dietary request. Such conclusions may have been generated by system 100 in previous iterations of methods, with or without validation of correctness by medical professionals such as functional medicine doctors, functional dieticians, functional nutritionists, and the like. Data entries in a dietary data database 500 may be flagged with or linked to one or more additional elements of information, which may be reflected in data entry cells and/or in linked tables such as tables related by one or more indices in a relational database; one or more additional elements of information may include data associating a dietary request with one or more cohorts, including demographic groupings such as ethnicity, sex, age, income, geographical region, or the like. Additional elements of information may include one or more categories of dietary data as described above. Additional elements of information may include descriptions of particular methods used to obtain dietary data, such as without limitation collecting dietary data from experts utilizing expert reports, papers, and/or opinions from experts who practice in a particular field related to a particular dietary request. Persons skilled in the art, upon reviewing the entirety of this disclosure, will be aware of various ways in which data entries in a dietary data database 500 may reflect categories, cohorts, and/or populations of data consistently with this disclosure.

With continued reference to FIG. 5, server 102 may be configured to have a feedback mechanism. In an embodiment, server 102 may be configured to receive a training set 104 generated by system 100. For example, data about a user that has been previously been analyzed by server 102 may be utilized in algorithms by first model 116 and/or second model 128. Such algorithms may be continuously updated as a function of such data. In yet another embodiment, data analyzed by language processing module 112 may be utilized as part of training data generating algorithms by first model 116 and/or second model 128 and/or any other machine learning process performed by server 102.

Figure 6:
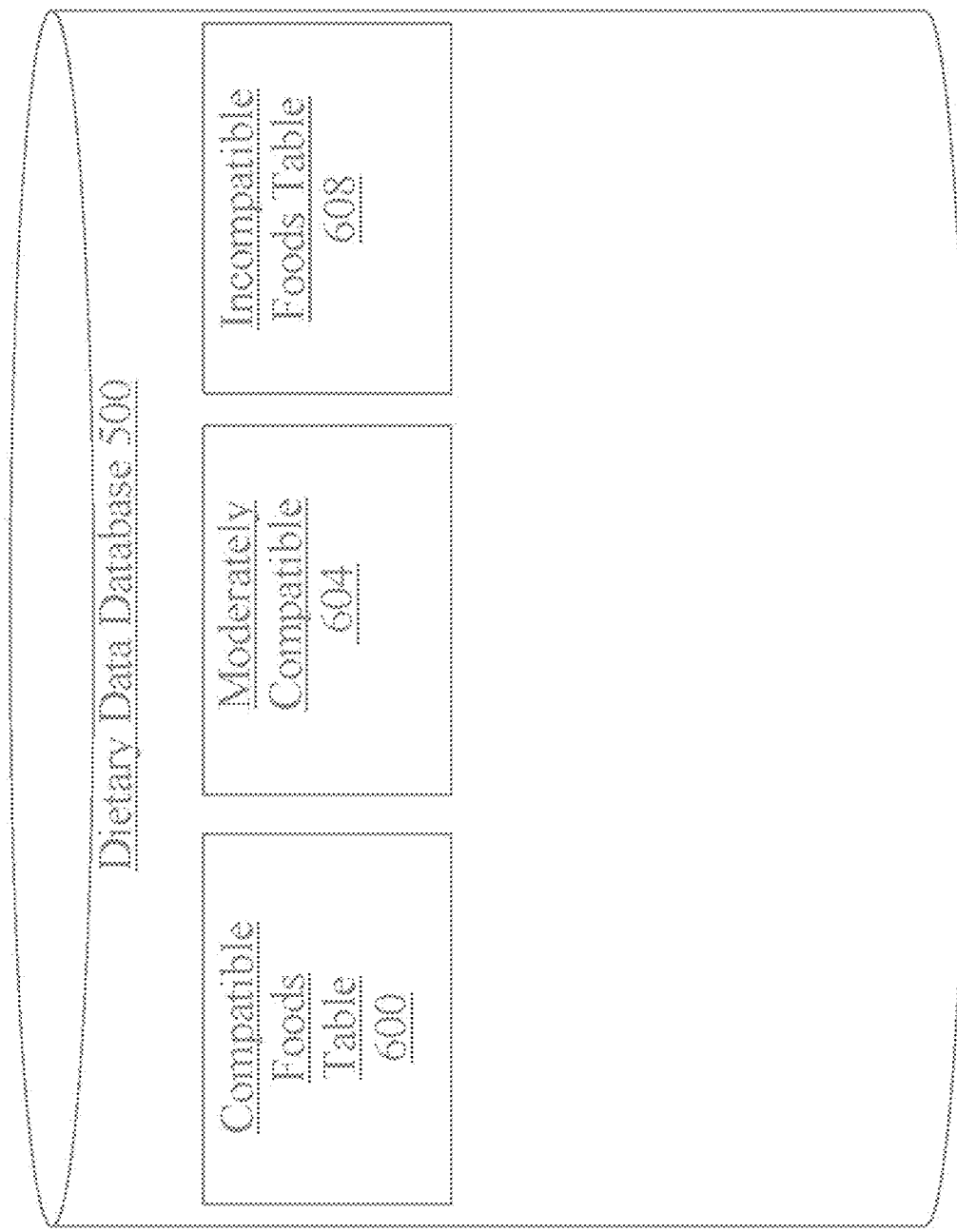
FIG. 6 is a block diagram illustrating an exemplary embodiment of a dietary data database.

Referring now to FIG. 6, one or more database tables in dietary data database 500 may include, as a non-limiting example, a compatible foods table 600. For instance and without limitation, compatible foods table 600 may be a table relating dietary requests to foods that are compatible with a particular dietary request; for instance where a dietary request contains a request for a ketogenic diet foods such as beef tips, ground sirloin and lamb shanks may be compatible with such a request while such foods may not be compatible with a dietary request for a vegan diet. Dietary data database 500 may include moderately compatible food table 604 which may be a table relating dietary request to foods that are moderately compatible with a particular dietary request; for instance where a dietary request contains a request for a gluten free diet from a user with a self-reported gluten intolerance, foods such as certified gluten free oats may be moderately compatible with such a user, while certified gluten free oats may not be compatible for a user following a gluten free diet because of a previous diagnosis of Celiac Disease. For instance and without limitation, dietary data database 500 may include as a non-limiting example, incompatible food table 608. For instance and without limitation, incompatible food table 608 may include a table relating dietary requests to foods that are incompatible with a particular dietary request; for instance where a dietary request contains a request for a corn free diet ingredients such as cornstarch, corn oil, dextrin, maltodextrin, dextrose, fructose, ethanol, maize, and/or sorbitol may be listed. In an embodiment, database tables contained within dietary data database 500 may include groupings of foods by different categories such as grains, meats, vegetables, fruits, sugars and fats, and the like. In an embodiment, database tables contained within dietary data database 500 may include groups of foods by ingredients that a food may be comprised of, for example gravy may contain flour which may contain gluten.

Referring again to FIG. 1, server 102 and/or another device in system 100 may populate one or more fields in dietary data database 500 using expert information, which may be extracted or retrieved from an expert knowledge database 504. An expert knowledge database 504 may include any data structure and/or data store suitable for use as dietary data database 500 as described above. Expert knowledge database 504 may include data entries reflecting one or more expert submissions of data such as may have been submitted according to any process described above in reference to FIG. 1, including without limitation by using first graphical user interface 110 and/or first graphical user interface 110. Expert knowledge database may include one or more fields generated by language processing module 112, such as without limitation fields extracted from one or more documents as described above. For instance, and without limitation, one or more categories of dietary data and/or related alimentary labels and/or categories of alimentary labels associated with an element of physiological state data as described above may be stored in generalized from in an expert knowledge database 504 and linked to, entered in, or associated with entries in a dietary data database 500. Documents may be stored and/or retrieved by server 102 and/or language processing module 112 in and/or from a document database 208; document database 208 may include any data structure and/or data store suitable for use as dietary data database 500 as described above. Documents in document database 208 may be linked to and/or retrieved using document identifiers such as URI and/or URL data, citation data, or the like; persons skilled in the art, upon reviewing the entirety of this disclosure, will be aware of various ways in which documents may be indexed and retrieved according to citation, subject matter, author, date, or the like as consistent with this disclosure.

Figure 7:
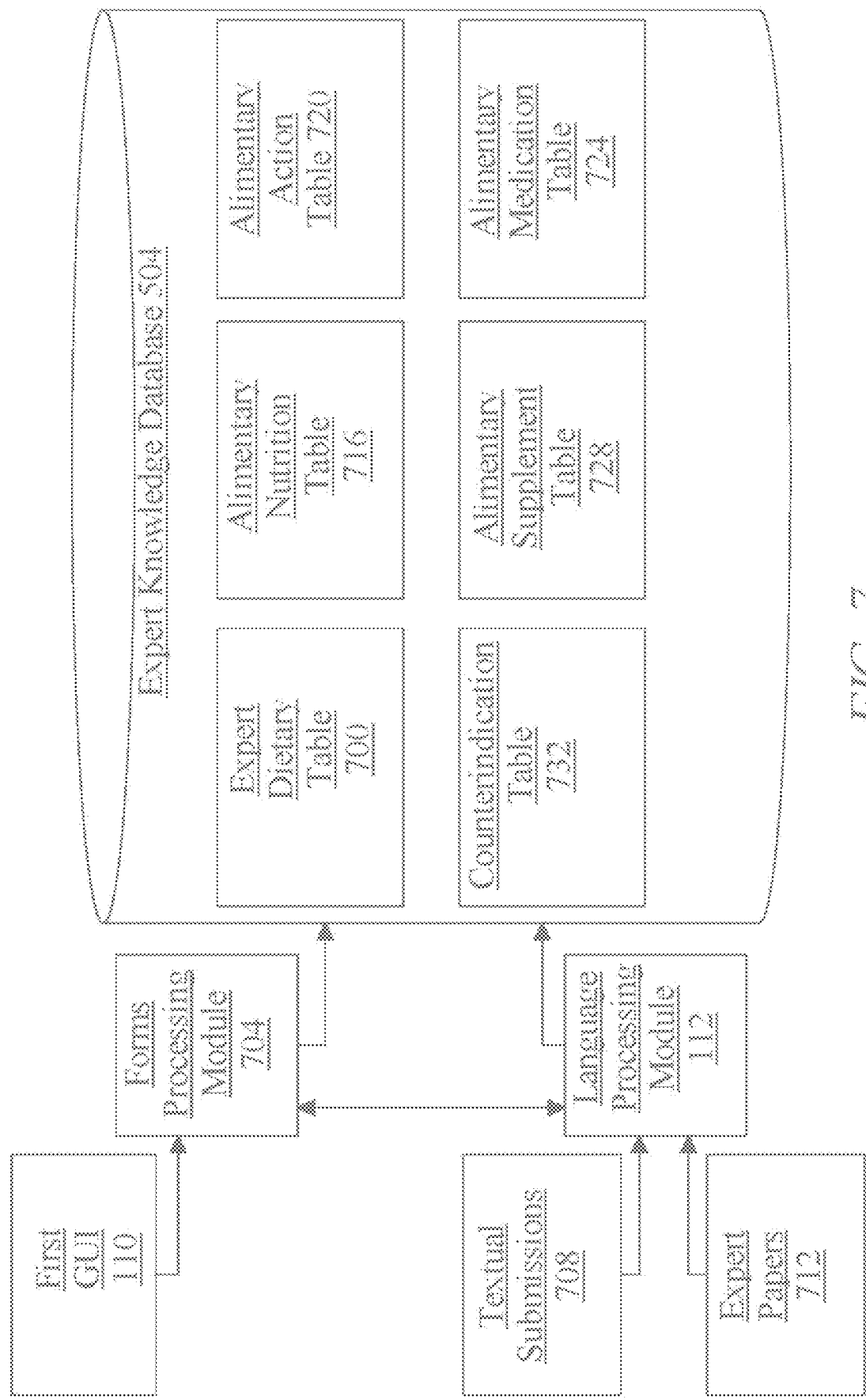
FIG. 7 is a block diagram illustrating an exemplary embodiment of an expert knowledge database.

Referring now to FIG. 7, an exemplary embodiment of an expert knowledge database 504 is illustrated. Expert knowledge database 504 may, as a non-limiting example, organize data stored in the expert knowledge database 504 according to one or more database tables. One or more database tables may be linked to one another by, for instance, common column values. For instance, a common column between two tables of expert knowledge database 200 may include an identifier of an expert submission, such as a form entry, textual submission, expert paper, or the like, for instance as defined below; as a result, a query may be able to retrieve all rows from any table pertaining to a given submission or set thereof. Other columns may include any other category usable for organization or subdivision of expert data, including types of expert data, names and/or identifiers of experts submitting the data, times of submission, or the like; persons skilled in the art, upon reviewing the entirety of this disclosure, will be aware of various ways in which expert data from one or more tables may be linked and/or related to expert data in one or more other tables.

Still referring to FIG. 7, one or more database tables in expert knowledge database 504 may include, as a non-limiting example, an expert dietary table 700. Expert dietary table 700 may be a table relating dietary data as described above to alimentary labels; for instance, where an expert has entered data relating an alimentary label to a category of dietary data and/or to an element of dietary data via first graphical user interface 110 as described above, one or more rows recording such an entry may be inserted in expert dietary table 700. In an embodiment, a forms processing module 704 may sort data entered in a submission via first graphical user interface 110 by, for instance, sorting data from entries in the first graphical user interface 110 to related categories of data; for instance, data entered in an entry relating in the first graphical user interface 110 to an alimentary label may be sorted into variables and/or data structures for storage of alimentary labels, while data entered in an entry relating to a category of dietary data and/or an element thereof may be sorted into variables and/or data structures for the storage of, respectively, categories of dietary data or elements of dietary data. Where data is chosen by an expert from pre-selected entries such as drop-down lists, data may be stored directly; where data is entered in textual form, language processing module 112 may be used to map data to an appropriate existing label, for instance using a vector similarity test or other synonym-sensitive language processing test to map dietary data to an existing label. Alternatively or additionally, when a language processing algorithm, such as vector similarity comparison, indicates that an entry is not a synonym of an existing label, language processing module may indicate that entry should be treated as relating to a new label; this may be determined by, e.g., comparison to a threshold number of cosine similarity and/or other geometric measures of vector similarity of the entered text to a nearest existent label, and determination that a degree of similarity falls below the threshold number and/or a degree of dissimilarity falls above the threshold number. Data from expert textual submissions 708, such as accomplished by filling out a paper or PDF form and/or submitting narrative information, may likewise be processed using language processing module 112. Data may be extracted from expert papers 712, which may include without limitation publications in medical and/or scientific journals, by language processing module 112 via any suitable process as described herein. Persons skilled in the art, upon reviewing the entirety of this disclosure, will be aware of various additional methods whereby novel terms may be separated from already-classified terms and/or synonyms therefore, as consistent with this disclosure. Expert dietary table 700 may include a single table and/or a plurality of tables; plurality of tables may include tables for particular categories of prognostic labels such as a current diagnosis table, a future prognosis table, a genetic tendency table, a metabolic tendency table, and/or an endocrinal tendency table (not shown), to name a few non-limiting examples presented for illustrative purposes only.

With continued reference to FIG. 7, one or more database tables in expert knowledge database 504 may include, as a further non-limiting example tables listing one or more alimentary process labels; expert data populating such tables may be provided, without limitation, using any process described above, including entry of data from first graphical user interface 110 via forms processing module 704 and/or language processing module 112, processing of textual submissions 708, or processing of expert papers 712. For instance, and without limitation, an alimentary nutrition table 716 may list one or more alimentary recommendations based on nutritional instructions, and/or links of such one or more alimentary recommendations to alimentary labels, as provided by experts according to any method of processing and/or entering expert data as described above. As an additional example, an alimentary supplement table 724 may list one or more alimentary processes based on nutritional supplements, such as vitamin pills or the like, and/or links of such one or more dietary requests to alimentary labels, as provided by experts according to any method of processing and/or entering expert data as described above. Alimentary supplement table 724 may list a recommended supplement a user may consider taking as a function of a dietary request. For example, a dietary request such as a vegan diet may be recommended to supplement with B vitamins. As a further non-limiting example, an alimentary medication table 728 may list one or more alimentary processes based on medications, including without limitation over-the-counter and prescription pharmaceutical drugs, and/or links of such one or more dietary requests to alimentary labels, as provided by experts according to any method of processing and/or entering expert data as described above. Alimentary medication table 728 may recommend a dietary request as a function of a medication a user may be taking. For example, a user taking an antibiotic such as metronidazole may be recommended to eliminate alcohol, while a user taking a medication such as doxycycline may be recommended to eliminate dairy containing products. As an additional example, a counterindication table 732 may list one or more counter-indications for one or more dietary requests; counterindications may include, without limitation allergies to one or more foods, medications, and/or supplements, side-effects of one or more medications and/or supplements, interactions between medications, foods, and/or supplements, exercises that should not be used given one or more dietary request.

Figure 8:
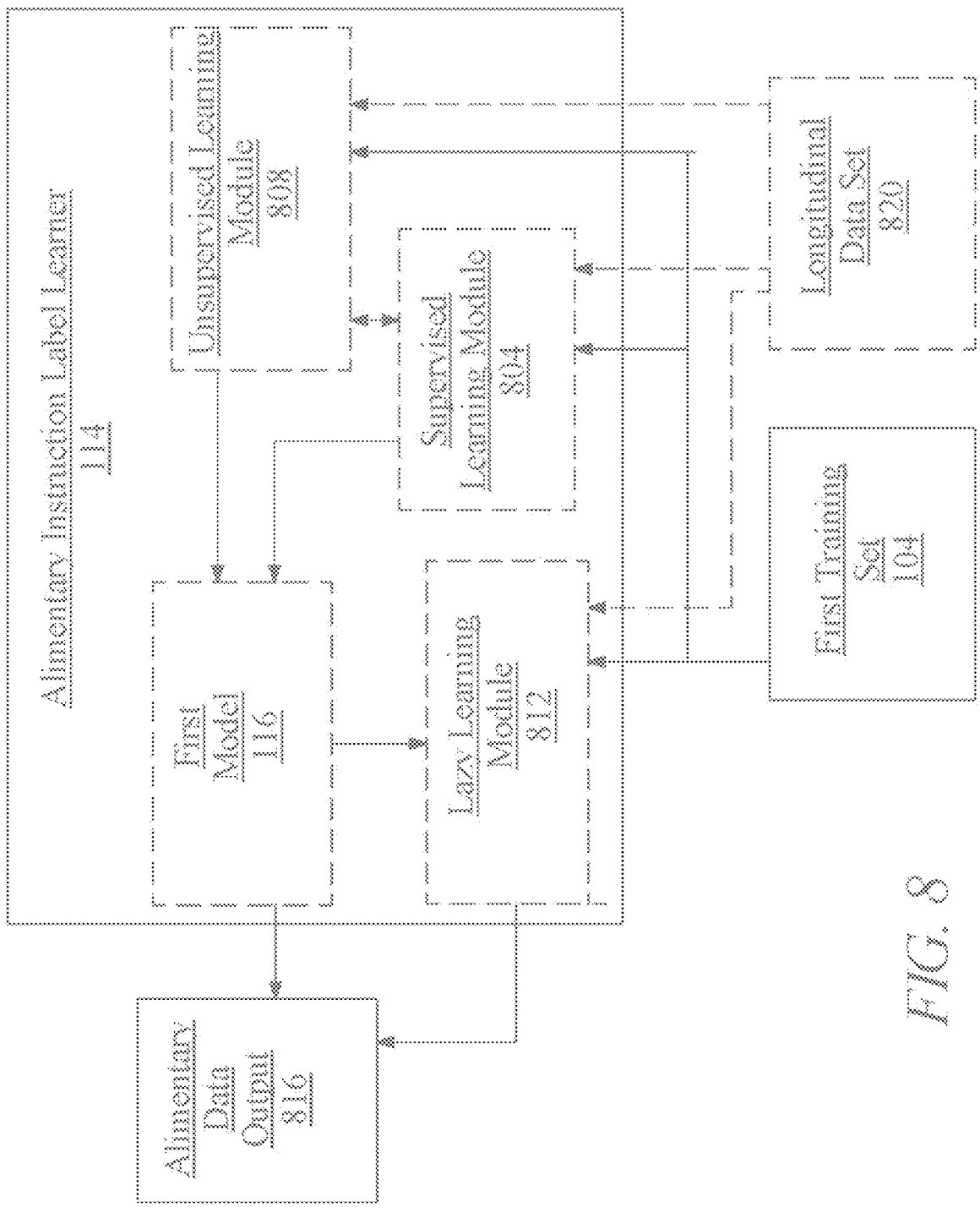
FIG. 8 is a block diagram illustrating an exemplary embodiment of an alimentary process label database.

Referring now to FIG. 8, an exemplary embodiment of alimentary instruction label learner 114 is illustrated. Alimentary instruction label learner 114 may be configured to perform one or more supervised learning processes, supervised learning processes may be performed by a supervised learning module 804 executing on server 102 and/or on another computing device in communication with server 102, which may include any hardware or software module. Machine-learning algorithms used by alimentary instruction label learner 114 may include supervised machine-learning algorithms, which may, as a non-limiting example be executed using a supervised learning module 804 executing on server 102 and/or on another computing device in communication with server, which may include any hardware or software module. Supervised machine learning algorithms, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may use elements of dietary data as inputs, alimentary labels as outputs, and a scoring function representing a desired form of relationship to be detected between elements of dietary data and alimentary labels; scoring function may, for instance, seek to maximize the probability that a given element of dietary data and/or combination of elements of dietary data is associated with a given alimentary label and/or combination of alimentary labels to minimize the probability that a given element of dietary data and/or combination of elements of dietary data is not associated with a given alimentary label and/or combination of alimentary labels. Scoring function may be expressed as a risk function representing an "expected loss" of an algorithm relating inputs to outputs, where loss is computed as an error function representing a degree to which a prediction generated by the relation is incorrect when compared to a given input-output pair provided in training set 104. Persons skilled in the art, upon reviewing the entirety of this disclosure, will be aware of various possible variations of supervised machine learning algorithms that may be used to determine relation between elements of dietary data and alimentary labels. In an embodiment, one or more supervised machine-learning algorithms may be restricted to a particular domain for instance, a supervised machine-learning process may be performed with respect to a given set of parameters and/or categories of parameters that have been suspected to be related to a given set of alimentary labels, and/or are specified as linked to a particular field of dietary requests. As a non-limiting example, a particular set of foods and/or food groups may be typically consumed by certain diets such as for example, coconut meat consumed on a ketogenic diets or raw foods diet, and a supervised machine-learning process may be performed to relate those foods and/or food groups to the various dietary requests; in an embodiment, domain restrictions of supervised machine-learning procedures may improve accuracy of resulting models by ignoring artifacts in training data. Domain restrictions may be suggested by experts and/or deduced from known purposes for particular evaluations and/or known tests used to evaluate alimentary labels. Additional supervised learning processes may be performed without domain restrictions to detect, for instance, previously unknown and/or unsuspected relationships between dietary data and alimentary labels.

With continued reference to FIG. 8, alimentary instruction label learner 114 may perform one or more unsupervised machine-learning processes as described above; unsupervised processes may be performed by an unsupervised learning module 508 executing on server 102 and/or on another computing device in communication with server 102, which may include any hardware or software module. For instance, and without limitation, alimentary instruction label learner 114 and/or server 102 may perform an unsupervised machine learning process on training set 104, which may cluster data of training set 104 according to detected relationships between elements of the training set 104, including without limitation correlations of alimentary labels to each other; such relations may then be combined with supervised machine learning results to add new criteria for alimentary instruction label learner 114 to apply in relating dietary data to alimentary labels. As a non-limiting, illustrative example, an unsupervised process may determine that a first dietary request correlates closely with a second dietary request, where the first dietary request has been linked via supervised learning processes to a given alimentary label, but the second has not; for instance, the second dietary request may not have been defined as an input for the supervised learning process, or may pertain to a domain outside of a domain limitation for the supervised learning process. Continuing the example, a close correlation between first dietary request and second dietary request may indicate that the second dietary request is also a good match for the alimentary label; second dietary request may be included in a new supervised process to derive a relationship or may be used as a synonym or proxy for the first dietary request by alimentary instruction label learner 114. Unsupervised processes performed by alimentary instruction label learner 114 may be subjected to any domain limitations suitable for unsupervised processes as described above.

Still referring to FIG. 8, server 102 and/or alimentary instruction label learner 114 may detect further significant categories of dietary requests, relationships of such categories to alimentary labels, and/or categories of alimentary labels using machine-learning processes, including without limitation unsupervised machine-learning processes as described above; such newly identified categories, as well as categories entered by experts in free-form fields as described above, may be added to pre-populated lists of categories, lists used to identify language elements for language learning module, and/or lists used to identify and/or score categories detected in documents, as described above. In an embodiment, as additional data is added to server 102, alimentary instruction label learner 114 and/or server 102 may continuously or iteratively perform unsupervised machine-learning processes to detect relationships between different elements of the added and/or overall data; in an embodiment, this may enable server 102 to use detected relationships to discover new correlations between known dietary requests, alimentary labels, and one or more elements of data in large bodies of data, such as nutritional, health, lifestyle, and/or dietary-related data, enabling future supervised learning and/or lazy learning processes to identify relationships between, e.g., particular dietary requests and particular alimentary labels. Use of unsupervised learning may greatly enhance the accuracy and detail with which system may detect alimentary labels.

Figure 9:
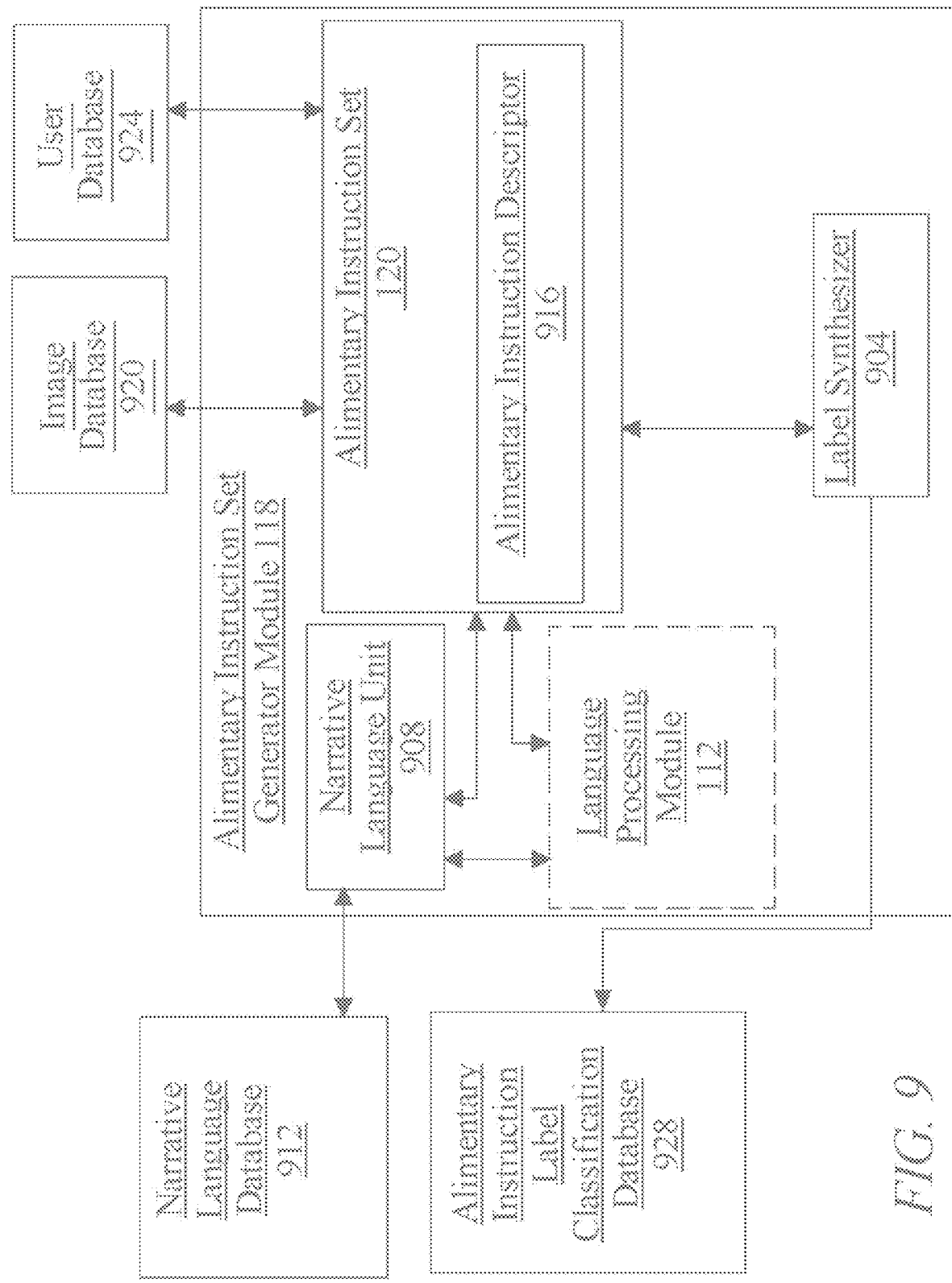
FIG. 9 is a block diagram illustrating an exemplary embodiment of an alimentary instruction set generator module.

Referring now to FIG. 9, an exemplary embodiment of alimentary instruction set module 118 is illustrated. Alimentary instruction set generator module 118 is configured to generate at least an alimentary instruction set as a function of the at least a dietary request from a user and the training set. Alimentary instruction set generator module 118 may produce at least an alimentary instruction set process descriptor 916 using at least an alimentary instruction set output. In an embodiment, alimentary instruction set generator module may include a label synthesizer 904 as described in more detail below.

With continued reference to FIG. 9, the alimentary instruction set may be transmitted to a user via a graphical user interface coupled to user client device 134 associated with user operating in or subscribing to network 100. Alimentary instruction set 120 may be utilized to aid a user in performing alimentary instruction set 120. Alimentary instruction set generator module 118 is designed and configured to generate an alimentary instruction set 120 based on dietary request from the user and the training data. In an embodiment, alimentary instruction set generator module 118 may generate alimentary instruction set 120 based on the integration of data associated with training set 104, any applicable external sources, and any applicable database within system 100. Generation of alimentary instruction set 120 may include identification of one or more alimentary instructions as a function of dietary request, and insertion of the one or more alimentary instructions in the alimentary instruction set 120; for instance, alimentary instruction set 120 may be formed, wholly or partially, by aggregating alimentary instructions and combining the aggregated alimentary instructions using narrative language module, narrative language database, image database, or the like.

With continued reference to FIG. 9, alimentary instruction set generator module 118 may include a label synthesizer 904. Label synthesizer 904 may include any suitable software or hardware module. In an embodiment, label synthesizer 904 may be designed and configured to combine a plurality of labels in at least a prognostic output together to provide maximally efficient data presentation. Combination of labels together may include elimination of duplicate information. For instance, label synthesizer 904 and/or at least a server 102 may be designed and configure to determine a first alimentary label of the at least an alimentary label is a duplicate of a second alimentary label of the at least an alimentary label and eliminate the first alimentary label. Determination that a first alimentary label is a duplicate of a second alimentary label may include determining that the first alimentary label is identical to the second alimentary label; for instance, an alimentary label generated from test data presented in one dietary request of at least a dietary request may be the same as an alimentary label generated from test data presented in a second dietary request of at least a dietary request. As a further non-limiting example, a first alimentary label may be synonymous with a second alimentary label, where detection of synonymous labels may be performed, without limitation, by a language processing module 112 as described above.

Continuing to refer to FIG. 9, label synthesizer 904 may group alimentary labels according to one or more classification systems relating the alimentary labels to each other. For instance, alimentary instruction set generator module 118 and/or label synthesizer 904 may be configured to determine that a first alimentary label of the at least an alimentary label and a second alimentary label of the at least an alimentary label belong to a shared category. A shared category may be an ingredient, food and/or or category of food or ingredient to which each of first alimentary label and second alimentary label belongs; as an example, lactose free diet and dairy free diet may be examples of dietary requests which may in turn share of a category of food ingredients such as milk alternatives including coconut milk, almond milk, hemp milk, oat milk, and/or soy milk.

With continued reference to FIG. 9, alimentary data may be identified and aggregated into a subset of applicable alimentary data based on at least a dietary request and training set 104. In an embodiment, alimentary instruction set 120 may comprise a plurality of alimentary data specific to user that is able to be used by machine learning and artificial intelligence systems in order to continuously update or modify training sets, and alimentary instruction set 120 based on updated or progressions associated with implementation of alimentary instruction set 120 by user. Alimentary data and non-alimentary data may include compilations of instruction sets received over a period of time, the compilations may account for improvements or modifications associated with user. Alimentary instruction set 120 may further include instructions over time, in which the alimentary instructions may change in response to changes in a user's data and/or prognosis. Alternatively or additionally, system 100 may periodically iterate through one or more processes as described in this disclosure, such that repeated reevaluations may modify alimentary instruction set 120 as information concerning user and/or dietary requests obtained from the user change over time.

With continued reference to FIG. 9, in one embodiment, alimentary instruction set generator module 118 may be configured to generate alimentary instruction set process descriptor 916 by converting one or more alimentary instruction set labels into narrative language. As a non-limiting example, alimentary instruction set generator module 118 may include and/or communicate with narrative language unit 908, which may be configured to determine an element of narrative language associated with at least an alimentary instruction set label and include the element of narrative language in current alimentary instruction set label descriptor. Narrative language unit 908 may implement this, without limitation, by using a language processing module 112 to detect one or more associations between alimentary instruction set labels, or lists of alimentary instruction set labels, and phrases and/or statements of narrative language. Alternatively or additionally, narrative language unit 908 may retrieve one or more elements of narrative language from narrative language database 912, which may contain one or more tables associating alimentary instruction set labels and/or groups of alimentary instruction set labels with words, sentences, and/or phrases of narrative language. One or more elements of narrative language may be included in alimentary instruction set, for instance for display to a user as text describing a current alimentary instruction set status of the user. Alimentary instruction set process descriptor 916 may further include one or more images; one or more images may be retrieved by alimentary instruction set generator module from an image database 920, which may contain one or more tables associating alimentary instruction set labels, groups of alimentary instruction set labels, alimentary instruction set process descriptors 1028, or the like with one or more images.

With continued reference to FIG. 9, in an embodiment, relationships between alimentary labels and categories may be retrieved from an alimentary instruction label classification database 928, for instance by generating a query using one or more alimentary labels of at least an alimentary output, entering the query, and receiving one or more categories matching the query from the alimentary instruction label classification database 928.

Figure 10:
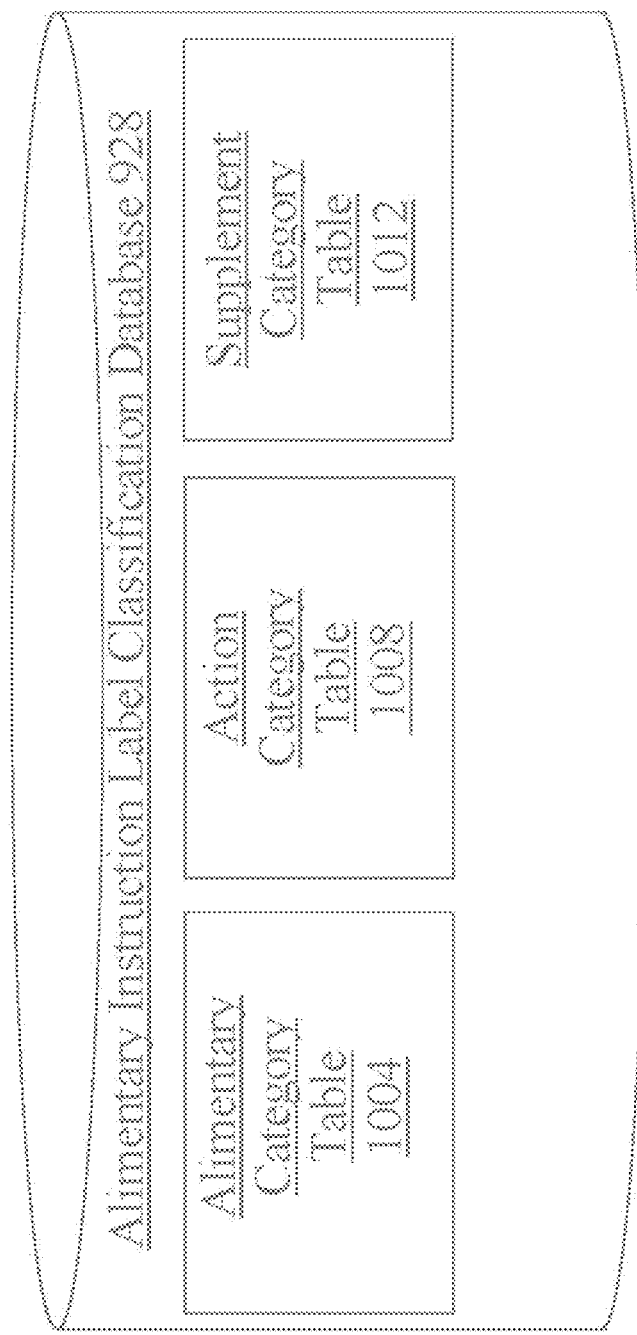
FIG. 10 is a block diagram illustrating an exemplary embodiment of an alimentary instruction label classification database.

Referring now to FIG. 10, an exemplary embodiment of an alimentary instruction label classification database 928 is illustrated. Alimentary instruction label classification database 928 may operate on the server 102. Alimentary instruction label classification database 928 may be implemented as any database and/or datastore suitable for use as a database. One or more database tables in alimentary instruction label classification database 928 may include, without limitation, an alimentary category table 704; which may associate an alimentary instruction label with one or more categories of nutritional properties, ingredients, foodstuffs, or the like. One or more database tables in alimentary instruction label classification database 928 may include, without limitation, a supplement table 712, which may describe a supplement that relates to a dietary request, such as a grain free diet with a recommendation for fiber supplementation or a vegetarian diet with a recommendation for B vitamin supplementation.

Figure 11:
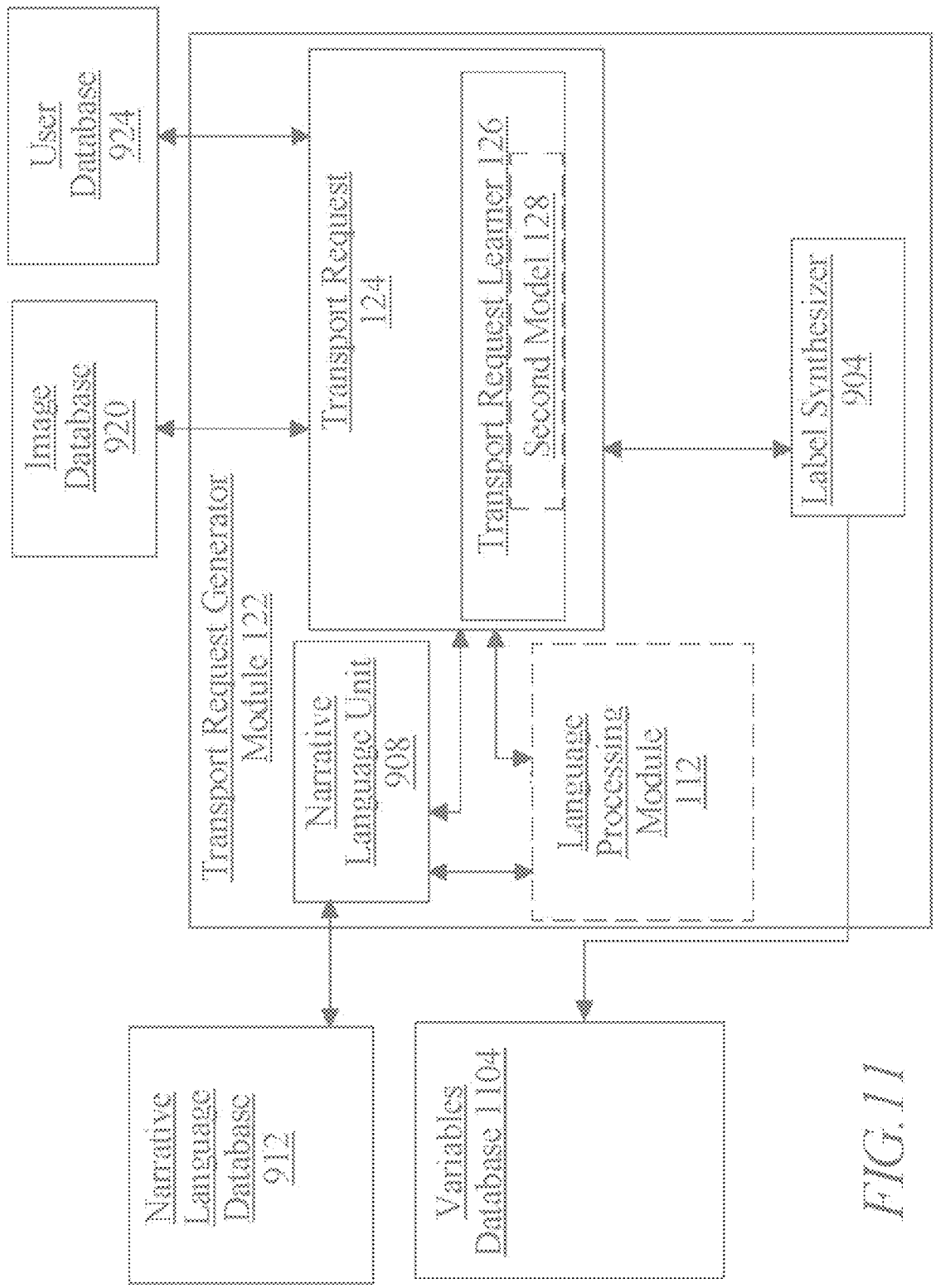
FIG. 11 is a block diagram illustrating an exemplary embodiment of a transport request generator module.

Referring now to FIG. 11, an exemplary embodiment of transport request generator module 122 is illustrated. Transport request generator module 122 may include any hardware or software module. Transport request generator module 122 is configured to generate transport request 124 as a function of the at least a dietary request from the user client device 134 and the training data. Transport request 124 may be generated by transport request learner 126 utilizing machine-learning as described herein. Transport request generator module 122 may perform supervised machine-learning, unsupervised machine-learning, and/or lazy learning processes. In an embodiment, transport request generator module 122 may generate transport request utilizing a loss function analysis as described above in more detail in reference to FIG. 1. Transport request generator module 122 may contain label synthesizer 904, which may include any of the label synthesizer 904. Narrative language unit 908 may be utilized to analyze one or more alimentary instruction sets and generate them into narrative language. Transport request generator module 122 may consult image database 920 and/or user database 924. In an embodiment, transport request generator module 122 includes a variables database 1104 configured to house data relating to external sources applicable to generation of transport request 124 such as, but not limited to shortage, recall, or unavailability of an alimentary component.

Figure 12:
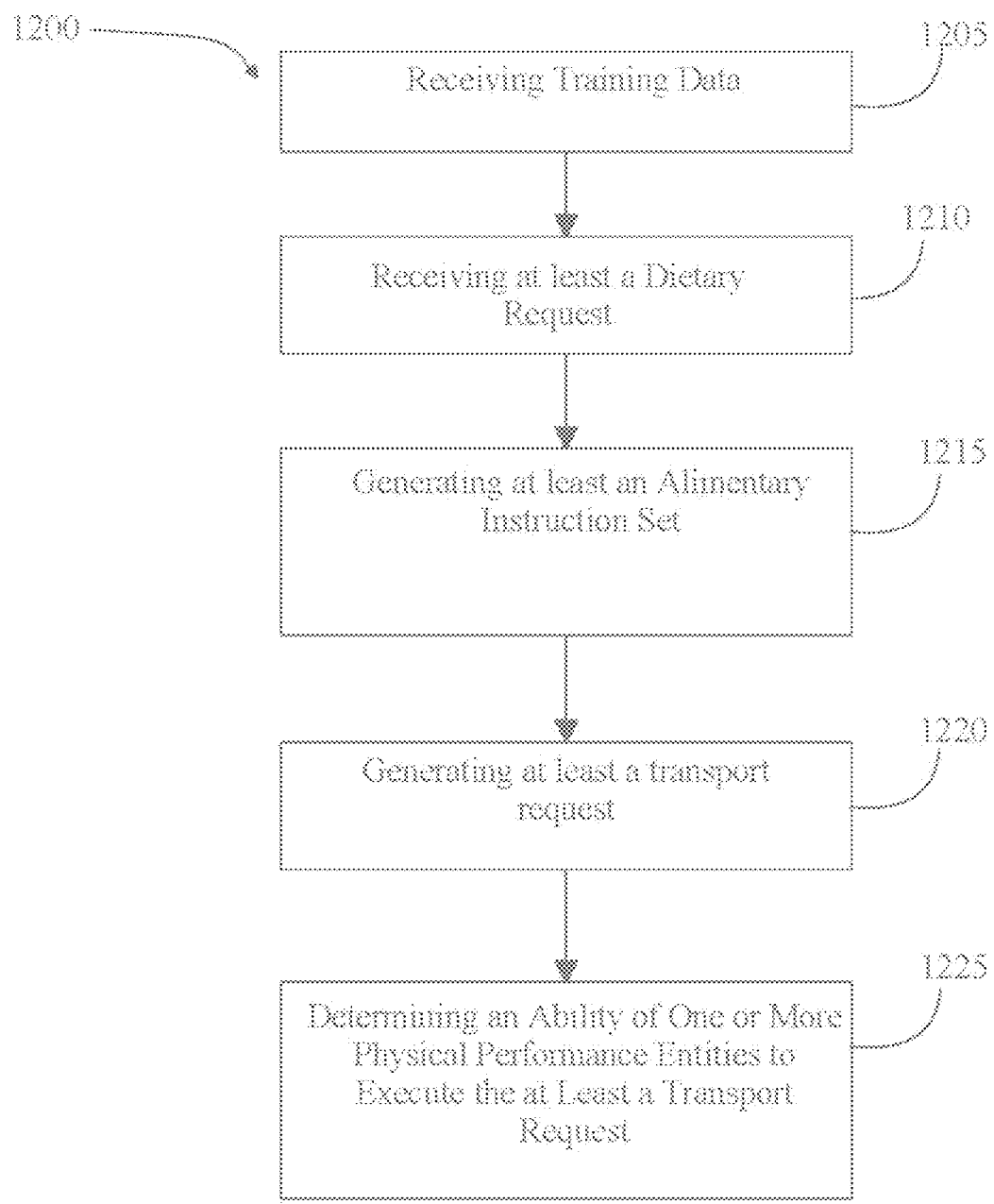
FIG. 12 is a flow diagram illustrating an exemplary method of arranging and executing transport of alimentary components based on dietary required eliminations.

Referring now to FIG. 12, an exemplary embodiment of a method 1200 of implementing arrangement and execution of transport request based on dietary required eliminations. At step 1205, training data within training set 104 including at least a dietary request and at least a correlated alimentary process label is received; this may be performed, without limitation, as described above in reference to FIGS. 1-12. At step 1210, at least a dietary request associated with user 202 is received from user client device 134; this may be performed, without limitation, as described above in reference to FIGS. 1-12. At step 1215, at least a server 102 makes a determination relating to the global position of user 202 based on user client device 134; this may be performed, without limitation, as described above in reference to FIGS. 1-12. In an embodiment, the determination is made via a global positioning system communicatively coupled to the at least a server 102. At step 1220, at least a server 102 selects one or more physical performance entities 304 within physical performance entity network 302 based on the global position and/or geo-location of user 202; this may be performed, without limitation, as described above in reference to FIGS. 1-12, for instance by using any method, method step, device, or component suitable for determining a location, position, or the like of a user or device, including without limitation a GPS device or other navigational device as described above. In an embodiment, user 202 may manually enter their global location and desired user destination 404 into user client device 134. At step 1225, transport request generator module 122 generates transport request 124 as a function of the at least a dietary request and the training data; this may be performed, without limitation, as described above in reference to FIGS. 1-12. At step 1230, at least a server 102 transmits user preference data as described herein to a client device associated with physical performance entity network 302, physical performance entity 304, or physical performance executor 402; this may be performed, without limitation, as described above in reference to FIGS. 1-12. At step 1235, at least a server 102 makes a determination of an ability of physical performance entity 304 to execute components of transport request 124; this may be performed, without limitation, as described above in reference to FIGS. 1-12. In an embodiment, the ability to execute components of transport request 124 may be based on user preference data, constraints associated with physical performance entity 304 or physical performance executor 402, or any other relevant data necessary for efficient execution of transport request 124.

Figure 13:
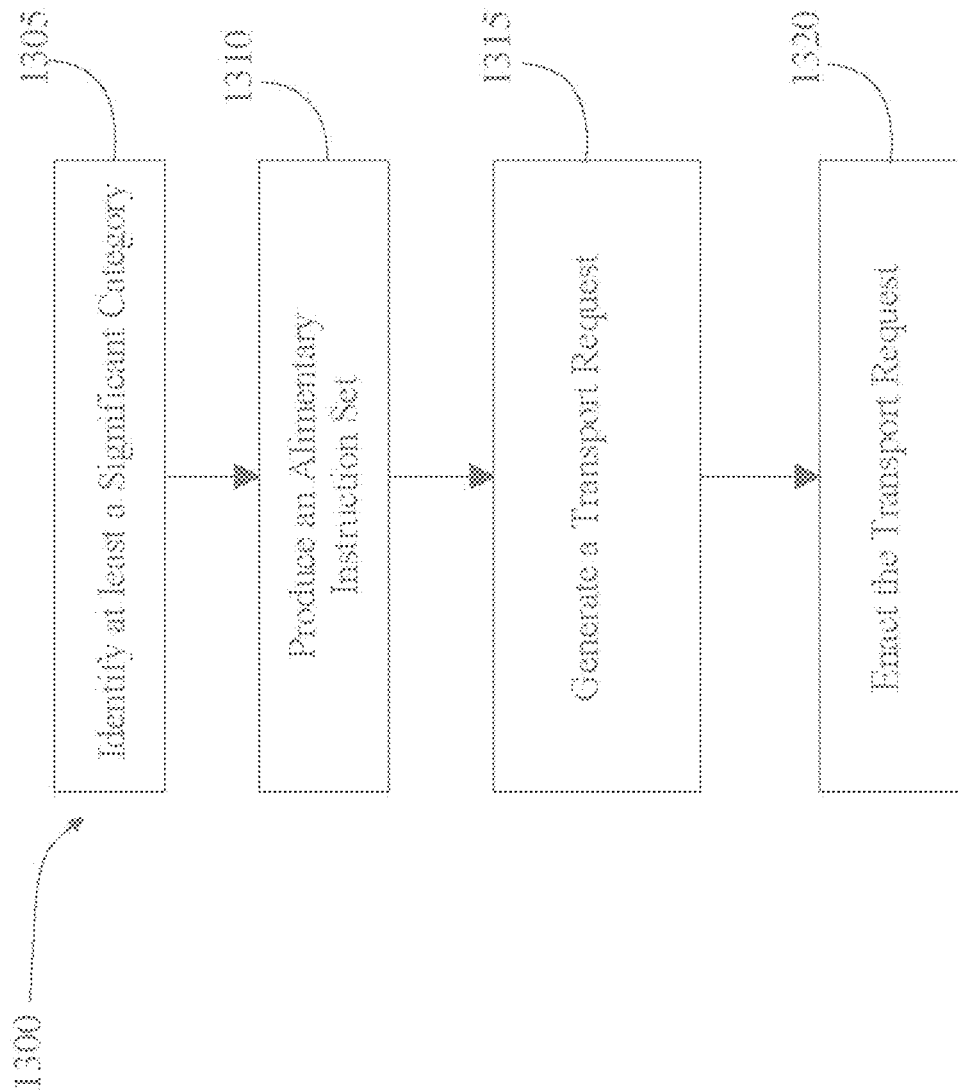
FIG. 13 is a flow diagram illustrating an exemplary method of enacting a transport request.

Now referring to FIG. 13, an exemplary embodiment of a method 1300 for enacting a transport request is illustrated. At step 1305 a computing device identifies at least a significant category as a function if a dietary request 106. Computing device includes any of the computing device as described above, in reference to FIGS. 1-12. Significant category includes any of the significant category as described above, in reference to FIGS. 1-12. Dietary request 106 includes any of the dietary request 106 as described above, in reference to FIGS. 1-12.

Still referring to FIG. 13, at step 1310, computing device produces an alimentary instruction set 120 s a function of the at least a significant category. Alimentary instruction set 120 includes any of the alimentary instruction set 120 as described above, in reference to FIGS. 1-12. Computing device identifies a compatible food group. Compatible food group includes any of the compatible food group as described above, in reference to FIGS. 1-12. Computing device produces alimentary instruction set 120 as a function of significant category and compatible food group, wherein producing includes any of the producing as described above, in reference to FIGS. 1-12.

Still referring to FIG. 13, at step 1315, computing device generates a transport request 124 as a function of alimentary instruction set 120 and dietary request 106. Transport request 124 includes any of the transport request 124 as described above, in reference to FIGS. 1-12.

Still referring to FIG. 13, at step 1320, computing device enacts transport request 124. Enacting includes any of the enacting as described above, in reference to FIGS. 1-12.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 14:
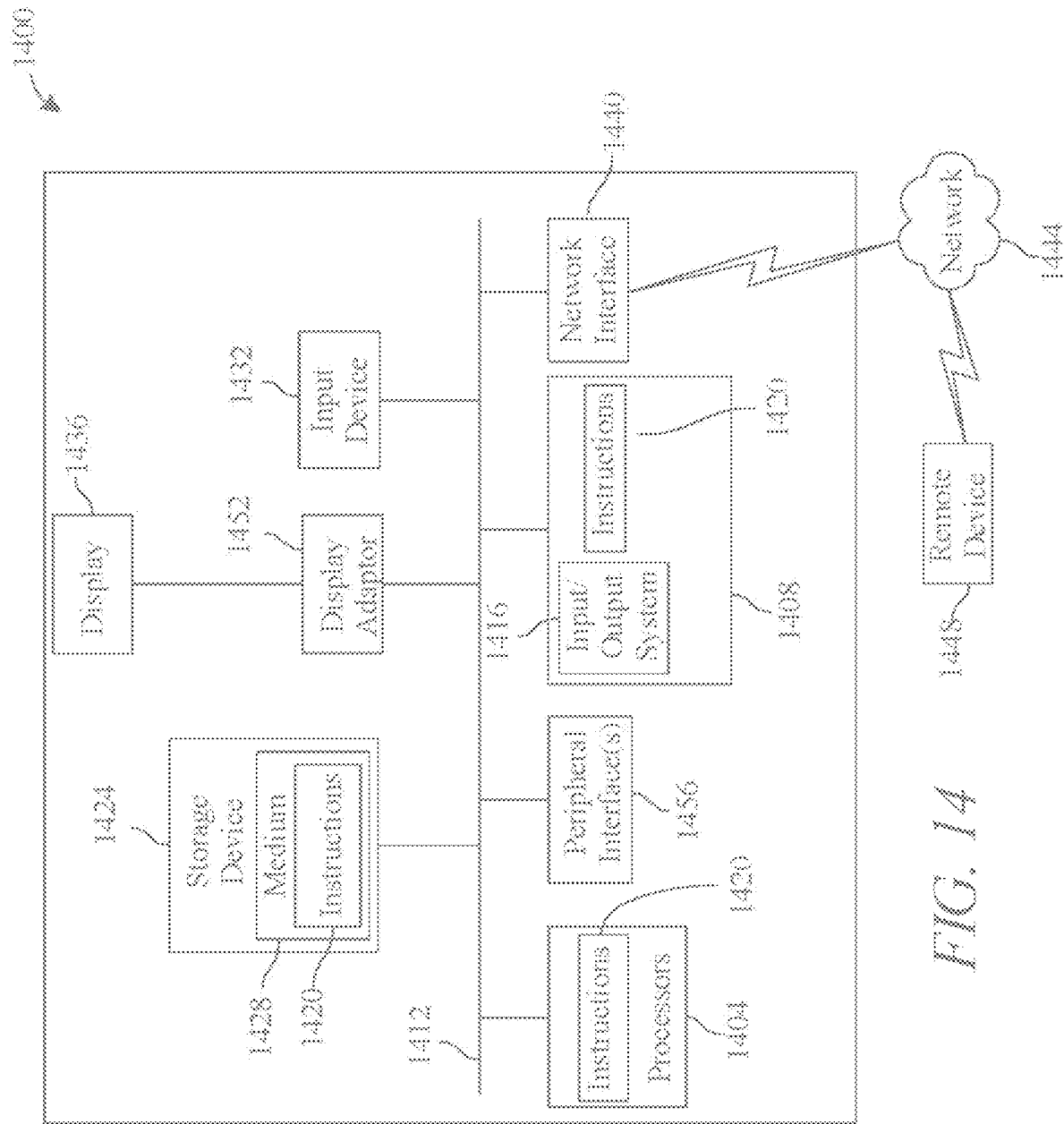
FIG. 14 is a block diagram of a computing system that can be used to implement any one or more of the methodologies disclosed herein and any one or more portions thereof.

FIG. 14 shows a diagrammatic representation of one embodiment of a computing device in the exemplary form of a computer system 1400 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1400 includes a processor 1404 and a memory 1408 that communicate with each other, and with other components, via a bus 1412. Bus 1412 may include any of several types of bus structures including, but not limited to, a memory bus, a memory controller, a peripheral bus, a local bus, and any combinations thereof, using any of a variety of bus architectures.

Memory 1408 may include various components (e.g., machine-readable media) including, but not limited to, a random-access memory component, a read only component, and any combinations thereof. In one example, a basic input/output system 1416 (BIOS), including basic routines that help to transfer information between elements within computer system 1400, such as during start-up, may be stored in memory 1408. Memory 1408 may also include (e.g., stored on one or more machine-readable media) instructions (e.g., software) 1420 embodying any one or more of the aspects and/or methodologies of the present disclosure. In another example, memory 1408 may further include any number of program modules including, but not limited to, an operating system, one or more application programs, other program modules, program data, and any combinations thereof.

Computer system 1400 may also include a storage device 1424. Examples of a storage device (e.g., storage device 1424) include, but are not limited to, a hard disk drive, a magnetic disk drive, an optical disc drive in combination with an optical medium, a solid-state memory device, and any combinations thereof. Storage device 1424 may be connected to bus 1412 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1424 (or one or more components thereof) may be removably interfaced with computer system 1400 (e.g., via an external port connector (not shown)). Particularly, storage device 1424 and an associated machine-readable medium 1428 may provide nonvolatile and/or volatile storage of machine-readable instructions, data structures, program modules, and/or other data for computer system 1400. In one example, software 1420 may reside, completely or partially, within machine-readable medium 1428. In another example, software 1420 may reside, completely or partially, within processor 1404.

Computer system 1400 may also include an input device 1432. In one example, a user of computer system 1400 may enter commands and/or other information into computer system 1400 via input device 1432. Examples of an input device 1432 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1432 may be interfaced to bus 1412 via any of a variety of interfaces (not shown) including, but not limited to, a serial interface, a parallel interface, a game port, a USB interface, a FIREWIRE interface, a direct interface to bus 1412, and any combinations thereof. Input device 1432 may include a touch screen interface that may be a part of or separate from display 1436, discussed further below. Input device 1432 may be utilized as a user selection device for selecting one or more graphical representations in a graphical interface as described above.

A user may also input commands and/or other information to computer system 1400 via storage device 1424 (e.g., a removable disk drive, a flash drive, etc.) and/or network interface device 1440. A network interface device, such as network interface device 1440, may be utilized for connecting computer system 1400 to one or more of a variety of networks, such as network 1444, and one or more remote devices 1448 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1444, may employ a wired and/or a wireless mode of communication. In general, any network topology may be used. Information (e.g., data, software 1420, etc.) may be communicated to and/or from computer system 1400 via network interface device 1440.

Computer system 1400 may further include a video display adapter 1452 for communicating a displayable image to a display device, such as display device 1436. Examples of a display device include, but are not limited to, a liquid crystal display (LCD), a cathode ray tube (CRT), a plasma display, a light emitting diode (LED) display, and any combinations thereof. Display adapter 1452 and display device 1436 may be utilized in combination with processor 1404 to provide graphical representations of aspects of the present disclosure. In addition to a display device, computer system 1400 may include one or more other peripheral output devices including, but not limited to, an audio speaker, a printer, and any combinations thereof. Such peripheral output devices may be connected to bus 1412 via a peripheral interface 1456. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, and systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for arranging transport of an alimentary component, the system comprising: a computing device comprising a processor and a memory, wherein the computing device is configured to:
    identify at least a significant category as a function of a dietary request for a user, wherein the dietary request for the user comprises at least an elimination of a food group as a function of user preference, and wherein elimination of a food group comprises at least excluding at least one ingredient;
    generate an alimentary instruction set as a function of the at least a significant category using an alimentary instruction set generator module, wherein the alimentary instruction set generator module includes an alimentary instruction label learner, and wherein the alimentary instruction set generator module is designed and configured to:

generate, using a first machine-learning model, an alimentary instruction set as an output, wherein the first machine-learning model relates the dietary request to an alimentary process label, wherein generating the alimentary instruction set further comprises:

identifying a compatible food group;

training the first machine-learning model, iteratively, using training data correlating a plurality of dietary requests and a plurality of alimentary process labels;

generating a machine-learning process after each iteration of the training, wherein the machine-learning process is configured to output the alimentary instruction set;

identifying the alimentary process label from a plurality of mutually exclusive alimentary process labels, as generated by the first machine-learning model, by ranking each mutually exclusive alimentary process label based on a relative probability of correctness determined by analyzing additional user data; and generating the alimentary instruction set as a function of the at least a significant category and the compatible food group; generate a transport request as a function of the alimentary instruction set and the dietary request using a transport request generator module, wherein the transport request generator module comprises a transport request learner, and wherein the transport request learner is designed and configured to:

generate a second machine-learning model as an output and using at least an alimentary instruction label and the training data as a function of the first machine-learning model as inputs, wherein the second machine-learning model relates the transport request to the alimentary process label; and enact the transport request as a function of a fulfillment network, wherein the fulfillment network further comprises a plurality of physical performance entity networks, and wherein the transport request represents a plurality of performances so that each of the plurality of performances is accounted for by one of the plurality of physical performance entity networks.

2. The system of claim 1, wherein identifying the at least a significant category includes extracting the at least a significant category from a document using a language processing module.

3. The system of claim 1, wherein identifying the at least a significant category further comprises:
receiving a food group relevance; and
ranking the at least a significant category as a function of a food group relevance.

4. The system of claim 1, wherein identifying the compatible food group further comprises receiving a constitutional restriction.

5. The system of claim 1, wherein producing the alimentary instruction set further comprises converting the alimentary instruction to a narrative language.

6. The system of claim 1, wherein generating the transport request further comprises:
outputting the alimentary instruction set to a user-client device;
receiving an implementation progress as a function of the alimentary instruction set; and
generating the transport request as a function of the implementation progress.

7. The system of claim 1, wherein enacting the transport request further comprises transmitting the alimentary instruction set to a physical performance entity as a function of the fulfillment network.

8. The system of claim 7, wherein transmitting the alimentary instruction set further comprises identifying a physical performance entity capable of arriving at a user location.

9. The system of claim 8, wherein identifying the physical performance entity further comprises determining a performance capacity.

10. The system of claim 8, wherein identifying the physical performance entity further comprises determining a scheduling conflict.

11. A method for arranging transport of an alimentary component, the method comprising:

identifying, by a computing device, at least a significant category as a function of a dietary request for a user, wherein the dietary request for the user comprises at least an elimination of a food group as a function of user preference, and wherein elimination of a food group comprises at least excluding at least one ingredient;

generating, by the computing device, an alimentary instruction set as a function of the at least a significant category an alimentary instruction set generator module, wherein the alimentary instruction set generator module includes an alimentary instruction label learner, and wherein the alimentary instruction set generator module is designed and configured to:

generate, using a first machine-learning model, an alimentary instruction set as an output, wherein the first machine-learning model relates the dietary request to an alimentary process label, wherein generating the alimentary instruction set further comprises:

identifying a compatible food group;

training the first machine-learning model, iteratively, using training data correlating a plurality of dietary requests and a plurality of alimentary process labels;

generating a machine-learning process after each iteration of the training, wherein the machine-learning process is configured to output the alimentary instruction set;

identifying the alimentary process label from a plurality of mutually exclusive alimentary process labels, as generated by the first machine-learning model, by ranking each mutually exclusive alimentary process label based on a relative probability of correctness determined by analyzing additional user data; and generating the alimentary instruction set as a function of the at least a significant category and the compatible food group;

generating, by the computing device, a transport request as a function of the alimentary instruction set and the dietary request using a transport request generator module, wherein the transport request generator module comprises a transport request learner, and wherein the transport request learner is designed and configured to:

generate a second machine-learning model as an output and using at least an alimentary instruction label and the training data as a function of the first machine-learning model as inputs, wherein the second machine-learning model relates the transport request to the alimentary process label; and enacting, by the computing device, the transport request as a function of a fulfillment network, wherein the fulfillment network further comprises a plurality of physical performance entity networks, and wherein the transport request represents a plurality of performances so that each of the plurality of performances is accounted for by one of the plurality of physical performance entity networks.

12. The method of claim 11, wherein identifying the at least a significant category includes extracting the at least a significant category from a document using a language processing module.

13. The method of claim 11, wherein identifying the at least a significant category further comprises:
  receiving a food group relevance; and
  ranking the at least a significant category as a function of a food group relevance.

14. The method of claim 11, wherein identifying the compatible food group further comprises receiving a constitutional restriction.

15. The method of claim 11, wherein producing the alimentary instruction set further comprises converting the alimentary instruction to a narrative language.

16. The method of claim 11, wherein generating the transport request further comprises:
  outputting the alimentary instruction set to a user-client device;
  receiving an implementation progress as a function of the alimentary instruction set; and
  generating the transport request as a function of the implementation progress.

17. The method of claim 11, wherein enacting the transport request further comprises transmitting the alimentary instruction set to a physical performance entity as a function of the fulfillment network.

18. The method of claim 17, wherein transmitting the alimentary instruction set further comprises identifying a physical performance entity capable of arriving at a user location.

19. The method of claim 18, wherein identifying the physical performance entity further comprises determining a performance capacity.

20. The method of claim 18, wherein identifying the physical performance entity further comprises determining a scheduling conflict.

* * * * *